(12) United States Patent
Rai et al.

(10) Patent No.: US 6,888,528 B2
(45) Date of Patent: May 3, 2005

(54) LIQUID CRYSTAL DISPLAY APPARATUS HAVING LIGHT COLLECTING MECHANISM

(75) Inventors: Yasuki Rai, Ogaki (JP); Hisao Uehara, Ogaki (JP); Yasushi Marushita, Gifu (JP); Makoto Shimizu, Ogaki (JP); Makoto Kitagawa, Gifu-ken (JP); Yusuke Tsutsui, Hashima (JP); Takeo Yoshimura, Gifu-ken (JP)

(73) Assignee: Sanyo Electric Co., Ltd., Osaka (JP)

( * ) Notice: Subject to any disclaimer, the term of this patent is extended or adjusted under 35 U.S.C. 154(b) by 24 days.

(21) Appl. No.: 09/344,629

(22) Filed: Jun. 25, 1999

(65) Prior Publication Data

US 2002/0050974 A1 May 2, 2002

(30) Foreign Application Priority Data

Jun. 29, 1998 (JP) .......................... 10-182393
Jun. 29, 1998 (JP) .......................... 10-182396
Mar. 30, 1999 (JP) .......................... 11-089247

(51) Int. Cl.[7] ................................................ G09G 3/36
(52) U.S. Cl. .................... 345/102; 345/207; 349/61
(58) Field of Search .......................... 345/102, 87–100, 345/207; 349/61–62, 63–64, 44

(56) References Cited

U.S. PATENT DOCUMENTS 5,818,553 A * 10/1998 Koenck et al. ............... 349/61
5,850,205 A * 12/1998 Blouin ........................ 345/102
5,952,992 A * 9/1999 Helms ......................... 345/102
6,144,359 A * 11/2000 Grave ......................... 345/102
6,195,140 B1 * 2/2001 Kubo et al. .................. 349/44

FOREIGN PATENT DOCUMENTS

| JP | 63-47330 | 3/1988 | .......... G02F/1/133 |
| JP | 06-083287 | 3/1994 | .......... G09G/3/36 |
| JP | 07-248492 | 9/1995 | .......... G02F/1/1335 |
| JP | 08-122534 | 5/1996 | .......... G02B/6/00 |
| JP | 09-311317 | 12/1997 | .......... G02F/1/133 |
| JP | 10-068948 | 3/1998 | .......... G02F/1/1335 |
| KR | 1993-28166 | 12/1993 | .......... G02F/1/1335 |
| KR | 1997-28698 | 6/1997 | .......... G02F/1/1335 |

* cited by examiner

*Primary Examiner*—Amr Awad
(74) *Attorney, Agent, or Firm*—Sheridan Ross PC

(57) ABSTRACT

A liquid crystal display apparatus includes a liquid crystal display panel having preset display characteristics, such as image brightness and contrast. A luminescent unit is optically connected with the display panel and provides light to the display panel in order to form an image on the display panel. The luminescent unit includes a light collector which collects ambient light and a light source, for generating light when the amount of ambient light is insufficient to generate a clear image. A control circuit is electrically connected to the display panel and automatically varies the preset display characteristics in accordance with the amount of ambient light collected by the light collector.

23 Claims, 15 Drawing Sheets

Fig.5A

| Amount of Ambient Light | ~500lx | 500 to 5klx | 5K to 50klx | 50klx~ |
|---|---|---|---|---|
| Brightness·Contrast Ratio | High | High | High | Low |
| Light Source | ON | ON | OFF | OFF |
| Cover | Close | Open | Open | Open |

Fig.5B

| Amount of Ambient Light | ~500lx | 500 to 1klx | 1K to 5klx | 5K to 50klx | 50klx~ |
|---|---|---|---|---|---|
| Brightness·Contrast Ratio | High | High | Low | High | Low |
| Light Source | ON | ON | ON | OFF | OFF |
| Cover | Close | Open | Open | Open | Open |

LIQUID CRYSTAL DISPLAY APPARATUS HAVING LIGHT COLLECTING MECHANISM

BACKGROUND OF THE INVENTION

The present invention relates to liquid crystal display apparatuses, and more particularly, to liquid crystal display apparatuses having light collecting mechanisms.

Liquid crystal display (LCD) apparatuses, which display images by controlling voltage, are made compact and thin and do not consume much electric power. Therefore, LCD apparatuses are often applied to office automation (OA) and audio visual (AV) equipment.

FIG. 1 is a schematic cross-sectional view showing a prior art LCD panel 100. The LCD panel 100 includes a first glass substrate 101 on which a plurality of pixel electrodes 102 are arranged. An orientation film 103 is applied to the first glass substrate 101 to cover the pixel electrodes 102. A second glass substrate 104, on which a common electrode 105 is formed, faces the first glass substrate 101. An orientation film 106 is applied to the common electrode 105. Liquid crystal 107 is sealed between the orientation films 103, 106.

The liquid crystal 107 has electro-optic anisotropy. Therefore, if voltage is applied to the pixel electrodes 102 and the common electrode 105, an electric field is applied to the liquid crystal 107 by the pixel electrodes 102 and the common electrode 105. The intensity of the electric field determines the transmittance of light. The LCD panel 100 is illuminated from behind by a luminescent portion, or backlight, to form a display image with each pixel having a predetermined brightness.

A liquid crystal display apparatus may be applied to the monitor of a portable television or a video camera, which are frequently used outdoors. Therefore, ambient light may be used to form display images on such monitors.

FIG. 2 is a cross-sectional view showing a prior art LCD apparatus that incorporates a light collecting mechanism. The LCD apparatus has an LCD panel 100 and a backlight 110, which are attached to a case 120. The backlight 110 includes a light guide plate 111 arranged adjacent to the LCD panel 100, a light source 114 located at a first end of the light guide plate 111, and a light collector 115 optically connected to a second end of the light guide plate 111. The light guide plate 111 includes a diffusing portion 112 facing the LCD panel 100 and a reflecting portion 113, which is arranged on the opposite side of the light guide plate 111. The display area of the LCD panel 100 and the light collector 115 are exposed from the case 120. The LCD panel 100 also includes a control circuit (not shown), which receives image signals and applies voltage to each pixel electrode.

It is preferred that a light emitting diode (LED), an electroluminescent (EL) device, or a fluorescent lamp be employed as the light source 114. A reflector 116 is arranged behind the light source 114. It is preferred that the light guide plate 111 be made of a transparent material such as acrylic resin, polycarbonate, or glass. The diffusing portion 112 and the reflecting portion 113 need not be formed separately from the light guide plate 111 and may be formed integrally with the light guide plate 111 by carrying out a diffusing treatment and an irregular reflection treatment. The light collector 115 draws ambient light, such as sunlight or indoor light, toward the light guide plate 111. Furthermore, the light collector 115 includes a lens that may be formed either integrally with or separately from the light guide plate 111.

The internal light from the light source 114 and the ambient light from the light collector 115 are transmitted to the light guide plate 111 and irregularly reflected by the reflecting portion 113. Some of the irregularly reflected light is diffused by the diffusing portion 112 and irradiated toward the LCD panel 100. The rest of the irregularly reflected light is reflected toward the reflection portion 113. In this manner, the internal or ambient light drawn toward the light guide plate 111 attenuates as it proceeds back and forth horizontally parallel to the plane of the drawing between the diffusing portion 112 and the reflecting portion 113. Images are displayed by controlling the transmittance of the light irradiated toward the LCD panel 100 from behind.

Ambient light is abundant on sunny days. Therefore, if the LCD apparatus is used outdoors on a sunny day, the light source 114 is not used. In other words, the LCD panel 100 is illuminated solely by the light collected through the light collector 115. The LCD panel 100 may be illuminated by the light source 114 when using the LCD apparatus indoors, where the amount of light is insufficient. Accordingly, the usage of ambient light decreases the total electric power consumption since the light source 114 need not be used so frequently.

However, turning the light source 114 on and off manually is troublesome. Furthermore, if the LCD apparatus is seldom used outdoors, the light source 114 is lit for a longer period of time. Thus, power consumption cannot be decreased effectively. Additionally, selective usage between the light source 114 and ambient light makes it difficult to maintain the image quality.

The image quality of the LCD panel 100 depends greatly on the contrast ratio and the brightness of image. The contrast ratio is the ratio of the maximum transmittance to the minimum transmittance. The image becomes clear when the contrast ratio is high. The brightness of image refers to the brightness of the display that is determined by the maximum transmittance and the illuminance of the backlight. When using ambient light, the illuminance of the backlight changes in accordance with the brightness of the ambient light. However, the voltage applied to the pixel electrodes 102 and the common electrode 105 remains the same even if the amount of ambient light changes. That is, the transmittance remains the same even if the amount of ambient light changes. This results in a nonuniform image quality.

Furthermore, the illuminance of the light source 114 is lower than that of the ambient light. Therefore, if the contrast ratio and brightness are determined using a criterion set for the ambient light, the illuminance of the light source is increased excessively. This increases the power consumption of the LCD panel 100. On the other hand, if the contrast ratio and brightness are determined using a criterion set for the light source 114, the passage of ambient light may not be blocked even if the transmittance is set to a minimum to display a black color. Further, the intensity of the transmission light may become too high if the transmittance is set to a maximum to display a white color. This results in a decreased visibility.

SUMMARY OF THE INVENTION

Accordingly, it is an object of the present invention to provide a liquid crystal display apparatus incorporating a light collecting mechanism that consumes less power and has an improved image quality.

In a first aspect of the present invention, a liquid crystal display apparatus is provided that includes a liquid crystal display panel having a predetermined display characteristic. A luminescent unit located adjacent to the liquid crystal display panel includes a light collector, which collects ambient light, and a light source. A control circuit electrically is connected to the liquid crystal display panel and varies the predetermined display characteristic in accordance with the amount of collected ambient light.

In a second aspect of the present invention, a liquid crystal display apparatus is provided that includes a liquid crystal display panel having a predetermined display characteristic. A luminescent unit is arranged adjacent to the liquid crystal display panel for providing light to the display panel to illuminate the display panel and includes a light collector, which collects ambient light, and a light source. A light receiving device generates a light amount signal corresponding to the amount of light illuminating the liquid crystal display panel. A control circuit is connected to the liquid crystal display panel and the light receiving device and varies the predetermined display characteristic in accordance with the light amount signal.

In a third aspect of the present invention, a liquid crystal display is provided that includes a liquid crystal display panel for displaying an image having a predetermined contrast ratio and brightness. A luminescent unit is arranged adjacent to the liquid crystal display panel and includes a light collector, which collects ambient light, a light source, and a cover, which opens and closes to selectively cover the light collector. A cover driving apparatus opens and closes the cover. A light receiving device generates a light receiving signal corresponding to the amount of ambient light. A control circuit is connected to the liquid crystal display panel, the light receiving device, the light source, and the cover driving apparatus and controls the ON/OFF of the light source, the opening and closing of the cover, and adjusts the contrast ratio and the brightness in accordance with the light receiving signal.

In a fourth aspect of the present invention, a liquid crystal display apparatus is provided that includes a liquid crystal display panel for displaying an image having a predetermined contrast ratio and brightness. A luminescent unit is arranged adjacent to the liquid crystal display panel and includes a light collector, which collects ambient light, a light source, and a cover, which opens and closes to selectively cover the light collector. A cover driving apparatus opens and closes the cover. A first light receiving device generates a first light receiving signal corresponding to an amount of ambient light. A second light receiving device generates a second light receiving signal corresponding to a total amount of light illuminating the liquid crystal panel, which includes the ambient light. A control circuit is connected to the liquid crystal display panel, the first and second light receiving devices, the light source, and the cover driving apparatus. The control circuit controls the ON/OFF of the light source and the opening and closing of the cover in accordance with the first light receiving signal and adjusts the contrast ratio and the brightness in accordance with the second light receiving signal.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 5A is a table illustrating the operation of a control circuit employed in the LCD apparatus of FIG. 3;

FIG. 5B is a table illustrating the operation of a control circuit employed in an LCD apparatus according to a second embodiment of the present invention;

DETAILED DESCRIPTION OF THE PREFERRED EMBODIMENTS

Figure 1:
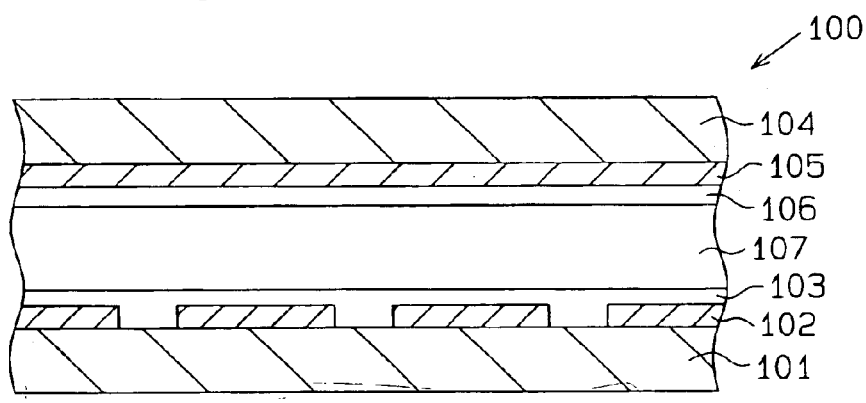
FIG. 1 is a cross-sectional view showing a prior art LCD panel.
Figure 2:
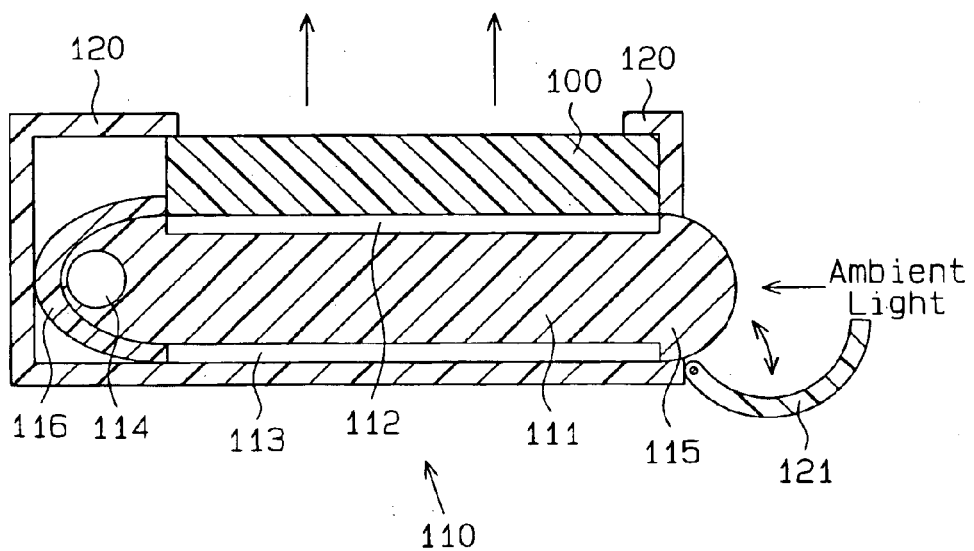
FIG. 2 is a cross-sectional view showing a prior art LCD apparatus incorporating a light collecting mechanism.

In the drawings, like numerals are used for like elements throughout.

Figure 3:
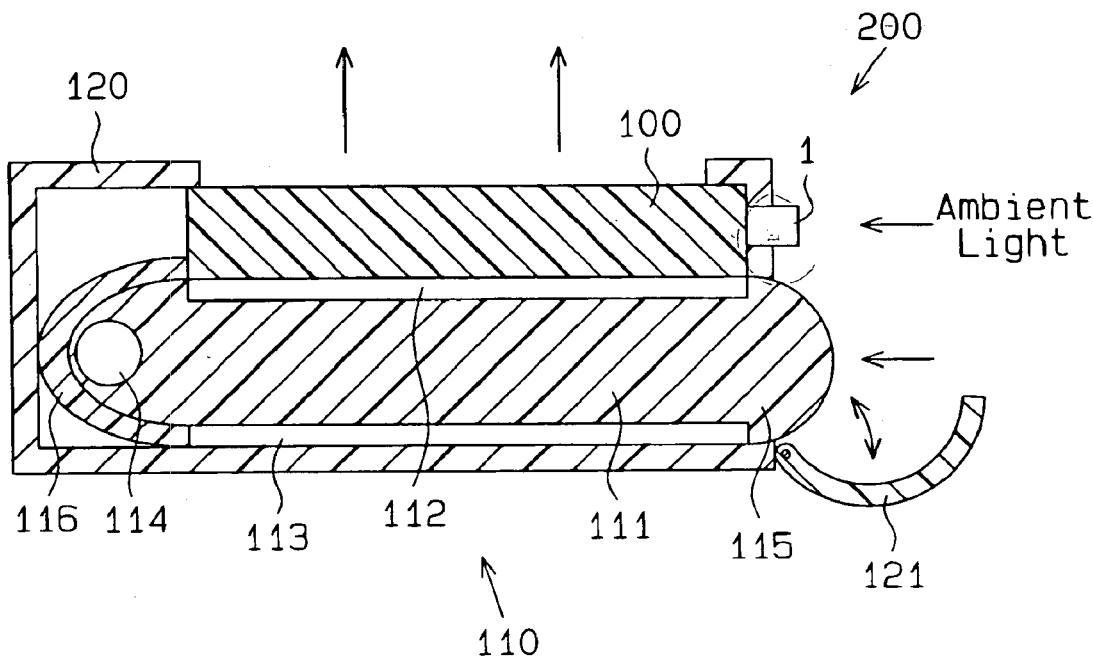
FIG. 3 is a cross-sectional view showing an LCD apparatus, which incorporates a light collecting mechanism, according to a first embodiment of the present invention.

FIG. 3 is a schematic cross-sectional view showing an LCD apparatus 200, which incorporates a light collecting mechanism, according to a first embodiment of the present invention. The LCD apparatus 200 has an LCD panel 100 and a backlight 110, which are attached to a case 120. The backlight 110 includes a light guide plate 111 arranged adjacent to the LCD panel 100, a light source 114 located at a first end of the light guide plate 111, and a light collector 115 optically connected to a second end of the light guide plate 111. The light guide plate 111 includes a diffusing portion 112 facing the LCD panel 100 and a reflecting portion 113 arranged on the side opposite to the LCD panel 100. The display area of the LCD panel 100 and the light collector 115 are exposed from the case 120. The light collector 115 has a lens and a cover 121, which covers the surface of the lens. The cover 121 is opened and closed by a cover driving device, which will be described later.

Figure 4:
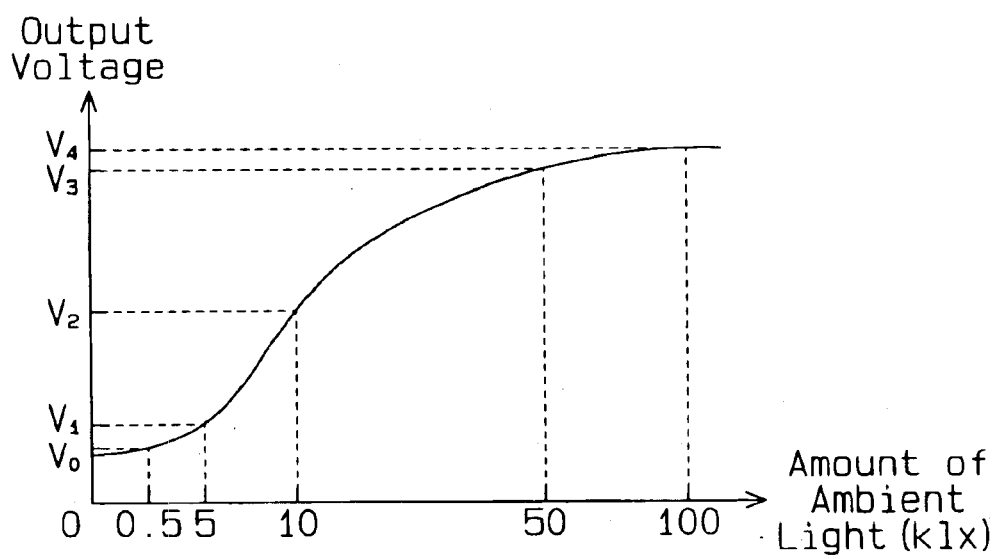
FIG. 4 is a graph showing the relationship between the amount of ambient light and the output voltage of a light receiving device.

The LCD apparatus 200 is provided with a light receiving device 1, which is preferably attached to the side surface of the case 120. The light receiving device 1 has a light receiving surface, which is exposed from the case 120, to generate output signals in accordance with the amount of ambient light. It is preferred that a photodiode be employed as the light receiving device 1. However, a phototransistor, an image sensor, or a solar cell may also be used as the light receiving device 1. FIG. 4 is a graph showing the relationship between the amount of ambient light and the output voltage of the light receiving device 1. The output voltage of the light receiving device 1 starts to increase as the ambient light exceeds approximately 200 lux, reaches its maximum increasing rate at approximately 10 kilolux, and keeps increasing until reaching approximately 100 kilolux.

The light receiving device 1 is connected to a control circuit of the LCD panel 100, which adjusts the brightness of image or contrast ratio of the LCD panel 100 in accordance with the output signal from the light receiving device 1, or the amount of ambient light. The control circuit also automatically opens and closes the cover 121 with a cover driving device and turns the light source 114 on and off. The operation of the control circuit in four different situations will now be described with reference to FIG. 5A.

First Situation

In extremely bright conditions (e.g., when using the LCD apparatus 200 directly under the sun on a sunny day) where the illumination is, for example, 50 kilolux or more, a visual display image can be formed solely with the ambient light collected by the light collector 115. In this case, the cover 121 is opened and the light source 114 is turned off. If the amount of ambient light is excessive, a slight amount of light is transmitted through the liquid crystal even if the transmittance of the liquid crystal is minimum (i.e., even if black is displayed). Therefore, the control circuit decreases the brightness of the image on the LCD panel 100. Furthermore, since a user's eyes are adapted to the brightness of the ambient environment, it is desirable that the contrast ratio be decreased to make the image more visible. Thus, the control circuit also decreases the contrast ratio.

Second Situation

Under bright conditions (e.g., when using the LCD apparatus 200 outdoors on a sunny day) where the illumination is, for example, 5 to 50 kilolux, the amount of ambient light is less than in the first situation. In such case, the control circuit increases the maximum transmittance of the liquid crystal to increase the brightness of the image. The control circuit also increases the contrast ratio. This forms a clear display image and increases visibility. In this state, the cover 121 is opened and the light source 114 is off.

Third Situation

Under dim conditions (e.g., when using the LCD apparatus 200 outdoors on a cloudy day or when using the LCD apparatus 200 indoors in the daytime) where the illumination is, for example, 500 lux to 5 kilolux, an image cannot be formed with only the ambient light. In such case, the cover 121 is opened to collect ambient light and the light source 114 is turned on by the control circuit to provide supplemental light.

Fourth Situation

Under dark conditions (e.g., when using the LCD apparatus 200 outdoors at nighttime) where the illumination is, for example, less than 500 lux, the control circuit closes the cover 121 and turns on the light source 114. The cover 121 is closed to prevent leakage of the light produced by the light source 114, which would decrease the amount of light. The control circuit further increases the image brightness and the contrast ratio since only the light of the light source 114 is used.

In the first embodiment, the control circuit copes with four situations. However, the control circuit may be operated in accordance with the characteristics of the LCD apparatus. For example, the brightness and the contrast ratio may be varied between two or more steps. Alternatively, the brightness and the contrast ratio may be varied continuously in accordance with the amount of ambient light. Furthermore, the brightness, the contrast ratio, the ON/OFF of the light source 114, and the closing and opening of the cover 121 may be controlled in accordance with the amount of ambient light that differs from that of the above four situations.

Figure 6A:
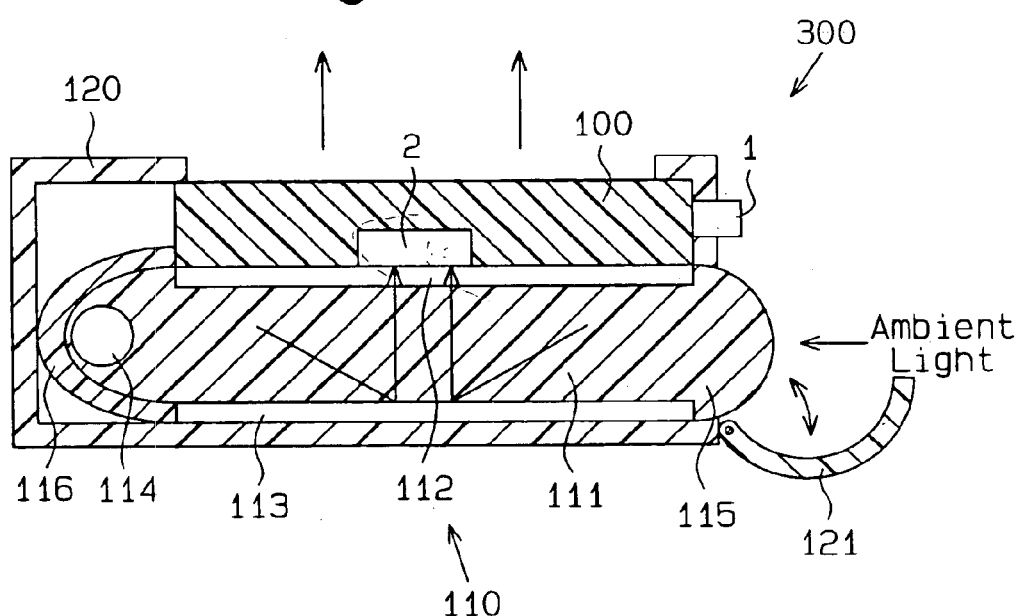
FIG. 6A is a schematic cross-sectional view showing an LCD apparatus, which incorporates a light collecting mechanism, according to the second embodiment of the present invention.
Figure 6B:
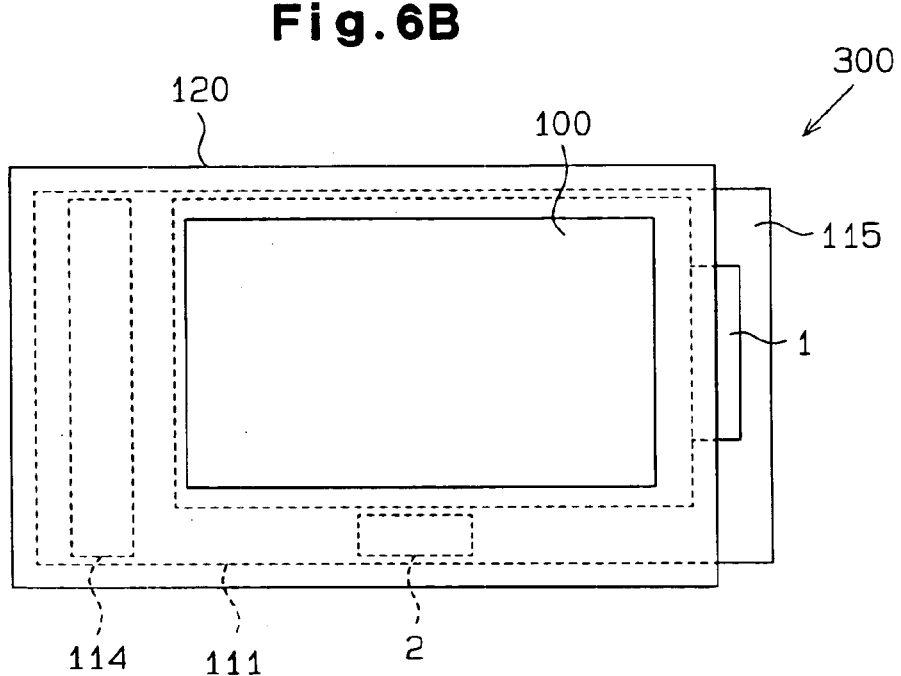
FIG. 6B is a schematic plan view showing the LCD apparatus of FIG. 6A.

FIG. 6A is a schematic cross-sectional view and FIG. 6B is a schematic plan view of an LCD apparatus 300, which incorporates a light collecting mechanism, according to a second embodiment of the present invention. The LCD apparatus 300 has an LCD panel 100 and an adjacent backlight 110, which are attached to a case 120. The backlight 110 includes a light guide plate 111 having a diffusing portion 112 and a reflecting portion 113, a light source 114, and a light collector 115. The display area of the LCD panel 100 and the light collector 115 are exposed from the case 120.

Figure 7:
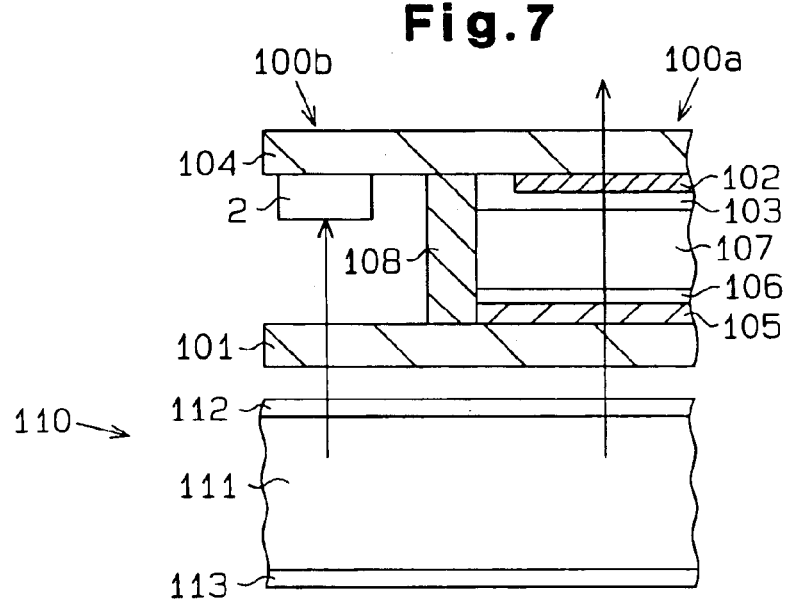
FIG. 7 is a partial, enlarged schematic cross-sectional view showing the LCD apparatus of FIG. 6A.

In the second embodiment, the LCD apparatus 300 is provided with a first light receiving device 1, which is preferably attached to the side surface of the case 12, and a second light receiving device 2, which is preferably arranged on the backlight 110 aligned with the LCD panel 100. More specifically, as shown in FIG. 7, a sealed portion 108 is defined between the glass substrates 101, 104 of the LCD panel 100. The sealed portion 108, in which liquid crystal is sealed, partitions a display area 100a from a peripheral circuit area 100b in the LCD panel 100. The second light receiving device 2 is arranged on the glass substrate 104, which faces the backlight 110, in the peripheral circuit area 100b. A photodiode or phototransistor is employed as the second light receiving device 2. The pixel electrodes 102, which are included in the display area 100a, and thin film transistors (TFT) (not shown), which are included in the peripheral circuit area, are formed on the glass substrate 104 with the second light receiving device 2. When employing a phototransistor as the second light receiving device 2, having a similar structure for the phototransistor and the TFT enables the two to be produced in the same manufacturing process.

In the second embodiment, a control circuit controls the ON/OFF of the light source 114 and the opening and closing of the cover 121 in accordance with the output signal (amount of ambient light) of the first light receiving element 1. The control circuit also adjusts the image brightness and contrast ratio in accordance with the output signal (the amount of light illuminating the LCD panel 100) of the second light receiving device 2. The light that illuminates the LCD panel 100 includes ambient light and the light of the light source 114, or internal light. Therefore, the brightness and contrast ratio are accurately adjusted in accordance with the light that illuminates the LCD panel 100. The operation of the control circuit in five different situations will now be described with reference to FIG. 5B.

First Situation

Under extremely bright conditions (e.g., when using the LCD apparatus 300 directly under the sun on a sunny day) where the illumination is, for example, 50 kilolux or more, a visual display image can be formed without using the light source 114. In this case, the cover 121 is opened in accordance with the output signal of the first light receiving device 1, and the light source 114 is turned off. If the amount of ambient light is excessive, a slight amount of light passes through the liquid crystal even if the transmittance of the liquid crystal is minimum (i.e., even if black is displayed). Therefore, the control circuit decreases the image brightness of the LCD panel 100 in accordance with the output signal of the second light receiving device 2. Furthermore, since the user's eyes are adapted to the brightness of the ambient environment, it is desirable that the contrast ratio be decreased to make the image more visible. Thus, the control circuit decreases the contrast in accordance with the output signal from the second light receiving device 2.

Second Situation

Under bright conditions (e.g., when using the LCD apparatus 300 outdoors on a sunny day) where the illumination is, for example, 5 to 50 kilolux, the amount of ambient light is less than in the first situation. In such case, the control circuit increases the maximum transmittance of the liquid crystal in accordance with the output signal of the second light receiving device 2 to increase the brightness of the image. The control circuit also increases the contrast ratio in accordance with the output signal of the second light receiving device 2. This forms a clear display image and increases visibility. In this state, the cover 121 is opened and the light source 114 is off.

Third Situation

Under dim conditions (e.g., when using the LCD apparatus 300 outdoors on a cloudy day or when using the LCD apparatus 300 indoors in the daytime) where the illumination is, for example, 1 to 5 kilolux, an image cannot be formed with only the ambient light. In such case, the cover 121 is opened to collect ambient light and the light source 114 is turned on by the control circuit to provide supplemental light. In this case, both ambient light and the internal light of the light source 114 are used. Thus, the amount of light is more in comparison to when using only the light source 114. Accordingly, the control circuit decreases the brightness and contrast ratio of the image.

Fourth Situation

Under dark conditions (e.g., when using the LCD apparatus 300 at nighttime in an illuminated room) where the illumination is, for example, 500 lux to 1 kilolux, the control circuit opens the cover 121 and turns on the light source 114. The control circuit also decreases the brightness of image and contrast ratio.

Fifth Situation

In extremely dark conditions (e.g., when using the LCD apparatus 300 outdoors at nighttime) where the illumination is, for example, less than 500 lux, the control circuit closes the cover 121 and turns on the light source 114. The cover 121 is closed to prevent leakage of the light produced by the light source 114, which would decrease the amount of light. The control circuit further increases the brightness of image and the contrast ratio since only the light of the light source 114 is used.

In the second embodiment, the control circuit closes the cover 121 when the output (amount of ambient light) of the first light receiving device 1 is indicative of less than a first predetermined value (500 lux), and turns on the light source 114 when the output is indicative of less than a second predetermined value (5 kilolux). The control circuit also adjusts the brightness of image and contrast ratio in accordance with the output (total amount of ambient and internal light) of the second light receiving device 2 to improve visibility.

It is preferred that the second light receiving device 2 be arranged at a substantially middle position between the light source 114 and the light collector 115. This is because the display area of the LCD panel 100 near the light collector 115 is brighter than that near the light source 114 if the cover 121 is opened when ambient light is abundant. On the other hand, when the cover 121 is closed and the light source 114 is on, the display area of the LCD panel 100 near the light collector 115 is darker than that near the light collector 114.

It is preferred that the LCD panel 100 be a driver incorporated type, in which a display pixel portion and a peripheral drive circuit are formed integrally on the same substrate. The display pixel portion is defined by thin film transistors, which are formed from a mutilcrystalline semiconductor such as polysilicon. The employment of a driver incorporated LCD panel eliminates the need for attaching a driver IC externally to the LCD panel, decreases the area of the LCD panel, and reduces the size and weight of the LCD apparatus. Thus, a driver incorporated LCD panel is optimal for portable equipment. Furthermore, the first and second light receiving devices 1, 2 can be formed integrally on the same substrate.

Figure 8:
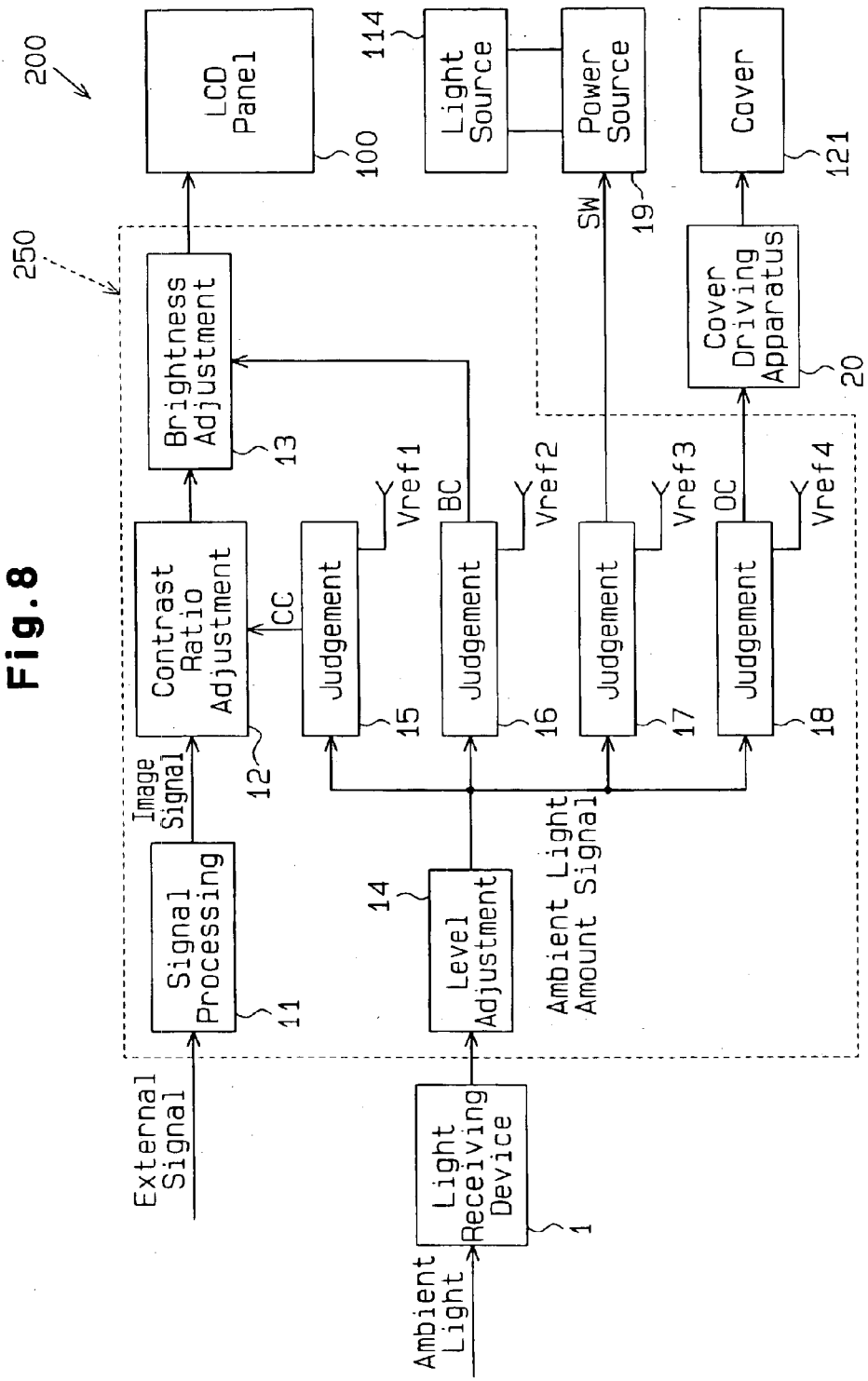
FIG. 8 is a schematic block diagram illustrating a first example of the LCD apparatus of the first embodiment.

FIG. 8 is a schematic block diagram of a first example of the LCD apparatus 200 according to the first embodiment of the present invention. The LCD apparatus 200 includes the light receiving device 1, a control circuit 250, the LCD panel 100, a power source 19, a cover driving apparatus 20, the cover 121, and the light source 114. The control circuit 250 includes a signal processing circuit 11, a contrast ratio adjustment circuit 12, a brightness adjustment circuit 13, a level adjustment circuit 14, a first judgement circuit 15, a second judgement circuit 16, a third judgement circuit 17, and a fourth judgement circuit 18. The first to fourth judgement circuits 15–18 may be formed as a single judgement circuit.

The signal processing circuit 11 receives image signals from an external apparatus (not shown) and executes predetermined processing on the image signals. The contrast ratio adjustment circuit 12 receives the processed image signals from the signal processing circuit 11 and adjusts the processed image signals to optimize the contrast ratio. The brightness adjustment circuit 13 receives the image signals, which contrast ratio has been optimized, from the contrast ratio adjustment circuit 12, and adjusts the image signals to optimize the brightness. The LCD panel 100 then displays an image by applying the appropriate voltage on each pixel electrode 102 in accordance with the image signals, which contrast ratio and brightness has been optimized or adjusted.

The level adjustment circuit 14 generates an analog voltage signal, which voltage (e.g., 5V) is optimal for a logic circuit and which serves as an ambient light signal. The light receiving device 1, which is a photodiode, generates a voltage in accordance with the amount of ambient light, as shown in FIG. 4. The light receiving device 1 employed in the first embodiment generates a maximum output voltage $V_4$ (approximately 0.1V) at 100 kilolux. In this case, the level adjustment circuit 14 is an operational amplifier, which multiplies the input voltage by $5/V_4$. The maximum value of the output voltage of the light receiving device 1 differs depending on the type of device used as the light receiving device 1. It is thus preferred that an operational amplifier corresponding to the maximum value be employed.

Each of the first to fourth judgement circuits 15, 16, 17, 18 receives analog voltage signals (ambient light amount signal) from the level adjustment circuit 14, compares the signals with a predetermined reference voltage Vref, and sends signals indicative of the comparison results to an associated circuit.

More specifically, a reference voltage Vref2 (Vref2=$V_3 \times 5/V_4$) is sent to the second judgement circuit 16. The voltage $V_3$ refers to the output voltage of the light receiving device 1 that corresponds to the amount of ambient light at which the brightness is required to be varied (in the first embodiment, 50 kilolux). If the analog voltage signal exceeds the reference voltage Vref2, the second judgement circuit 16 sends a brightness adjustment signal BC, which has a predetermined level, to the brightness adjustment circuit 13. The brightness adjustment circuit 13 then shifts the image signals to decrease the brightness of the image in accordance with the brightness adjustment signal BC.

Figure 9:
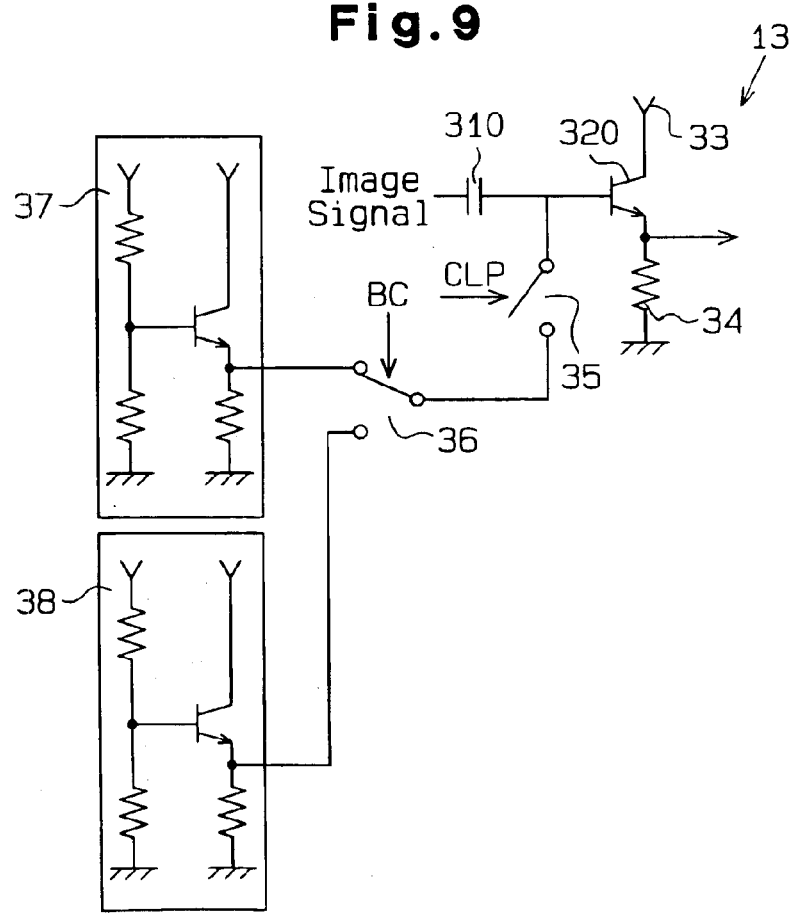
FIG. 9 is a schematic circuit diagram showing a brightness adjustment circuit of the LCD apparatus of FIG. 8.

FIG. 9 is a circuit diagram showing a preferred embodiment of the brightness adjustment circuit 13. The brightness adjustment circuit 13 includes a capacitor 310, a transistor 320, a resistor 34, two switches 35, 36, and two constant voltage sources 37, 38. The transistor 320 is connected between a high potential power source 33 and a low potential power source, such as ground. An image signal is applied to the gate of the transistor 320 by way of the capacitor 310 to vary the current flowing through the transistor 320. The output signal of the brightness adjustment circuit 13 is output from the node between the transistor 320 and the resistor 34. The switch 35 is turned on by a clamp signal CLP, which is output during a horizontal blanking period. The switch 36 is changed by the brightness adjustment signal BC to apply the voltage of either the first constant voltage source 37 or the second constant voltage source 38 to the gate of the transistor 320 as a clamp level during the horizontal blanking period. The clamp level is the voltage value that determines the minimum value of the range of the voltage applied to the pixel electrodes 102 and the common electrode 105. The clamp level of the first constant voltage source 37 is Vclp1, while the clamp level of the second constant voltage source 38 is Vclp2.

Figure 10A:
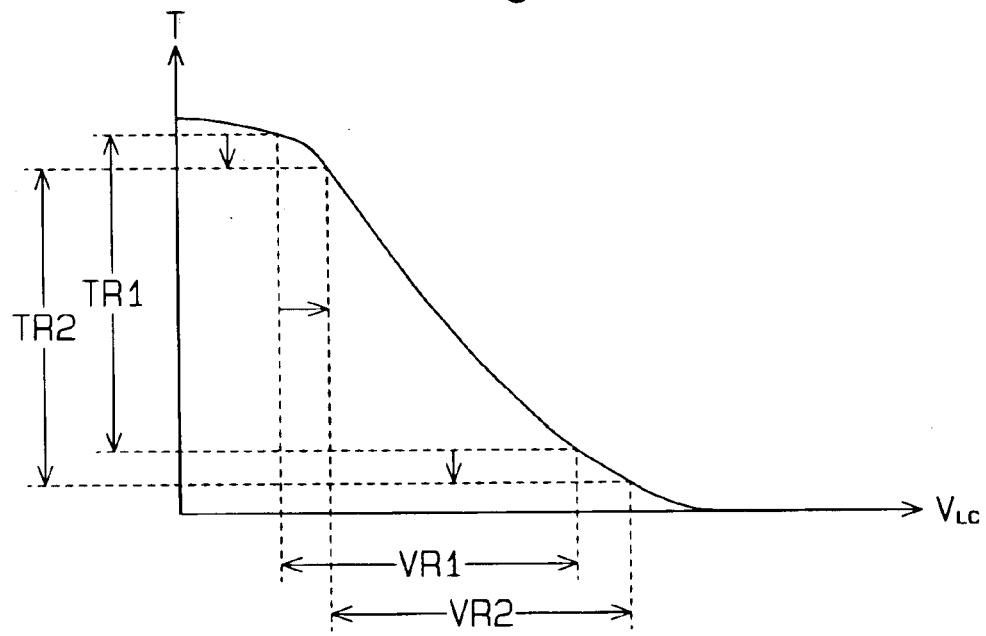
FIG. 10A is a first graph showing the relationship between the applied voltage and the transmittance of an LCD panel of the LCD apparatus of FIG. 8 in a normally white mode.
Figure 10B:
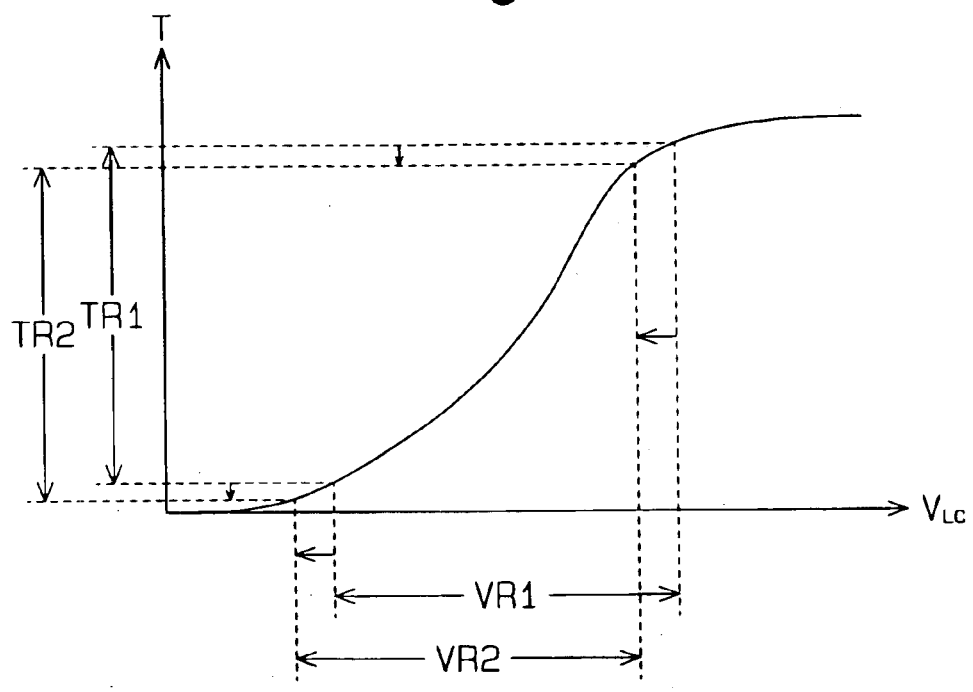
FIG. 10B is a first graph showing the relationship between the applied voltage and the transmittance of the LCD panel of the LCD apparatus of FIG. 8 in a normally black mode.

FIG. 10A is a graph showing the relationship between the voltage $V_{LC}$, which is applied to the pixel electrodes 102 and the common electrode 105, and the transmittance T of the liquid crystal 107 in a normally white mode. FIG. 10B is a graph showing the relationship between the voltage $V_{LC}$ and the transmittance T in a normally black mode. The transmittance is maximum when the applied voltage $V_{LC}$ is 0V in the normally white mode. On the other hand, the transmittance is minimum when the applied voltage $V_{LC}$ is 0V in the normally black mode.

Operation during the normally white mode will now be described. Under a dark situation where the analog voltage signal of the level adjustment circuit 14 is equal to or lower than the reference signal Vref2, the first clamp level Vclp1 is sent to the gate of the transistor 320 from the first constant voltage source 37 by way of the switch 36. Accordingly, the minimum value of the range VR1 of the voltage $V_{LC}$ is set at the first clamp level Vclp1. In this state, the transmittance of the liquid crystal 107 varies within range TR1, which corresponds to the voltage range VR1.

When the amount of ambient light increases thereby causing a brightness adjustment signal BC to be sent to the second judgement circuit 16, the switch 36 shifts to the second constant voltage source 38. This sends the second clamp level Vclp2, which is higher than the first clamp level Vclp1, to the gate of the transistor 320. In this state, the range of the voltage $V_{LC}$ remains unchanged. Therefore, the range of the voltage $V_{LC}$ is shifted from VR1 to VR2. This causes the transmittance of the liquid crystal 107 to vary within range TR2, which corresponds to the voltage range VR2. In this manner, the transmittance of the LCD panel 100 is controlled such that its brightness decreases entirely.

In the normally black mode, if the amount of external light is small, the minimum value of the range VR1 of the voltage $V_{LC}$ is set at the second clamp level Vclp2. If the amount of ambient light exceeds a predetermined value, the minimum value of the range VR1 is lowered to the first clamp level Vclp1 and the voltage range is shifted from VR1 to VR2 to decrease the brightness.

Returning to FIG. 8, a reference voltage Vref1 (Vref1= $V_3' \times 5/V_4$) is sent to the first judgement circuit 15. The voltage $V_3$ refers to the output voltage of the light receiving device 1 that corresponds to the amount of ambient light at which the contrast ratio is required to be varied (in the first embodiment, 50 kilolux). In the first embodiment, the voltage outputs $V_3$ and $V_3'$, or reference voltages Vref1, Vref2 are substantially equal to each other. The first judgement circuit 15 sends a contrast ratio adjustment signal CC, which has a predetermined level, to the contrast ratio adjustment circuit 12 if the analog voltage signal exceeds the reference voltage Vref1. The contrast ratio adjustment signal CC narrows the amplitude of the image signals to decrease the contrast ratio.

Figure 11A:
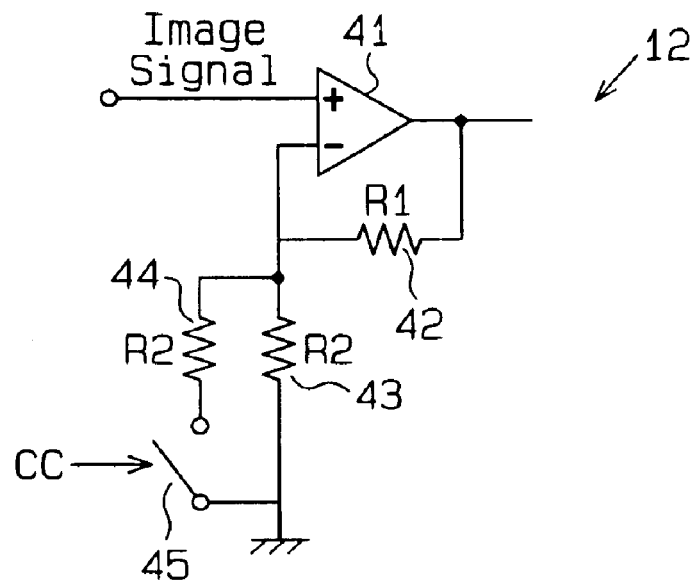
FIGS. 11A and 11B are schematic circuit diagrams illustrating a contrast ratio adjustment circuit of the LCD apparatus of FIG. 8.
Figure 11B:
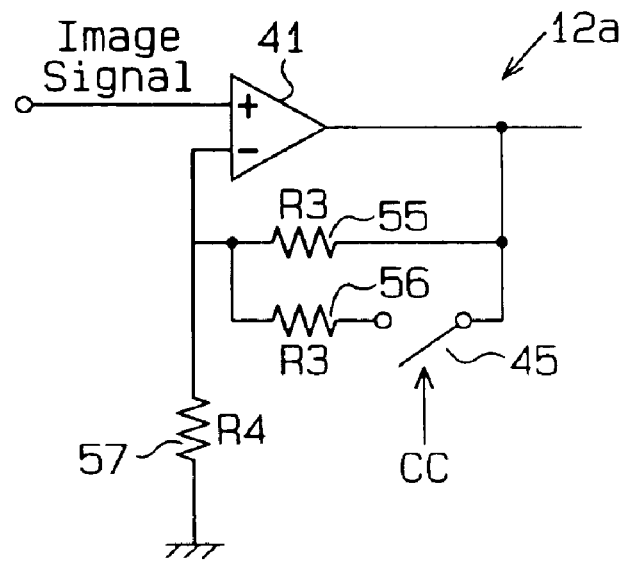

FIG. 11A is a circuit diagram showing the contrast ratio adjustment circuit 12. The contrast ratio adjustment circuit 12 includes an operational amplifier 41, a resistor 42 provided in the feedback path of the operational amplifier 41, a resistor 43 connected between the reverse input of the operational amplifier 41 and the ground, and a resistor 44 arranged parallel to the resistor 43 by way of a switch 45. The switch 45 is turned on and off in response to the contrast ratio adjustment signal CC. When the switch 45 is turned on, the resistors 43, 44 form a parallel circuit and decrease the amplifying rate of the operational amplifier 41. FIG. 11B is a circuit diagram showing another example of a contrast ratio adjustment circuit 12a. The contrast ratio adjustment circuit 12a includes an operational amplifier 41, a resistor 55 provided in the feedback path of the operational amplifier 41, a resistor 56 arranged parallel to the resistor 55 by way of a switch 45, and a resistor 57 connected between the reverse input terminal of the operational amplifier 41 and the ground.

Figure 12A:
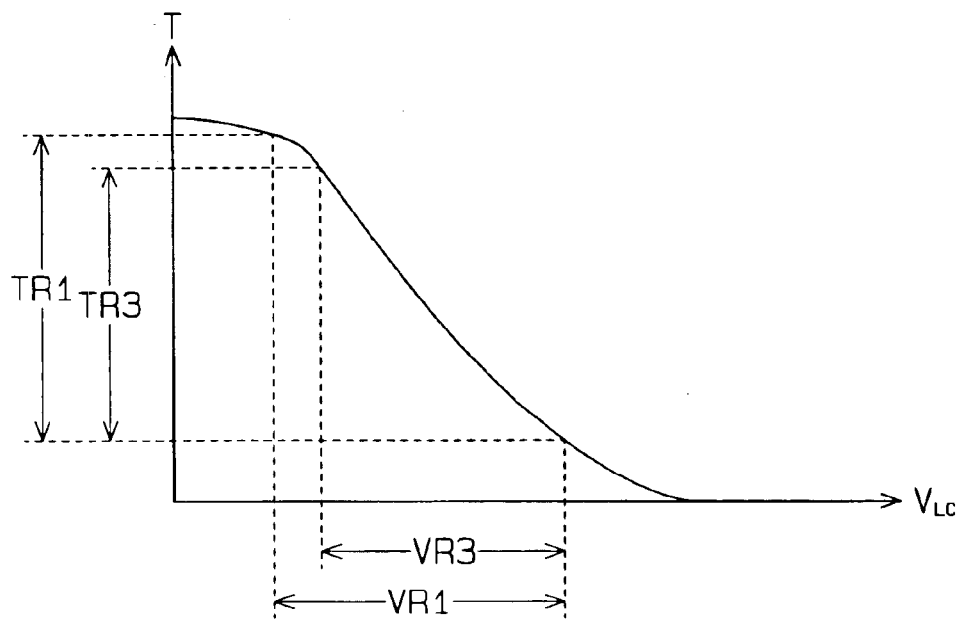
FIG. 12A is a second graph showing the relationship between the applied voltage and the transmittance of the LCD panel in a normally white mode.
Figure 12B:
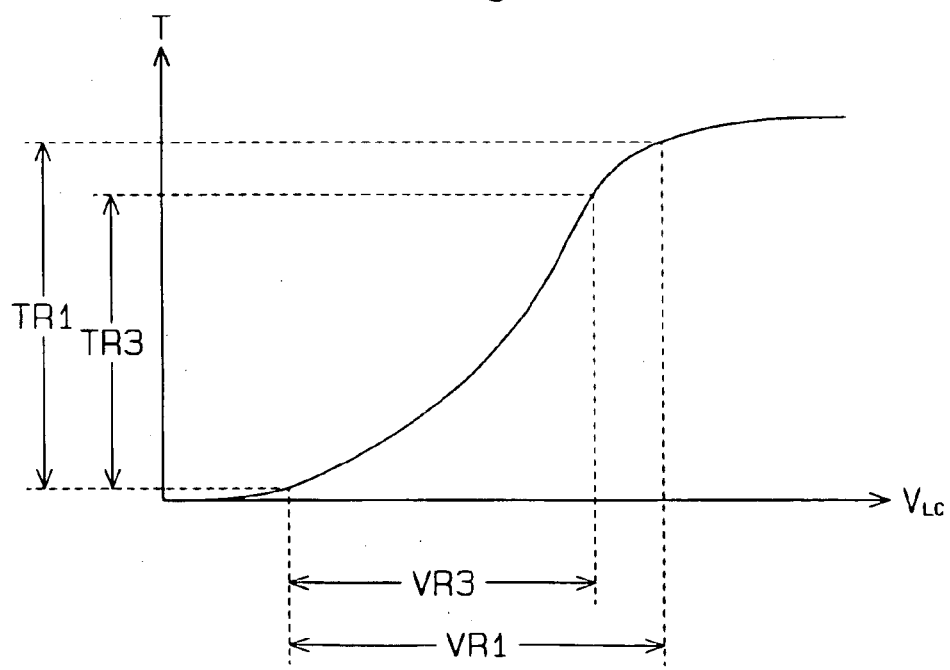
FIG. 12B is a second graph showing the relationship between the applied voltage and the transmittance of the LCD panel in a normally black mode.

FIG. 12A is a second graph showing the relationship between the applied voltage $V_{LC}$ and the transmittance T in the normally white mode. FIG. 12B is a second graph showing the relationship between the applied voltage $V_{LC}$ and the transmittance T in the normally black mode. The operation performed during the normally white mode will now be described.

In a dark situation, where the analog signal is equal to or lower than the reference signal Vref1, the switch 45 is turned off and the operational amplifier 41 is operated with a first amplifying rate. Accordingly, a voltage $V_{LC}$, which is within range VR1, is applied to vary the transmittance of the liquid crystal within range TR1, which corresponds to range VR1.

If the amount of ambient light increases thereby causing the first judgement circuit 15 to output a contrast ratio adjustment signal CC, the switch 45 is turned on to decrease the amplifying rate of the operational amplifier 41 and narrow the range of the voltage output by the operational amplifier 41. Since the clamp level of the applied voltage remains unchanged, the voltage range is narrowed from VR1 to VR3. Thus, the transmittance of the liquid crystal 107 varies within range TR3, which corresponds to voltage range VR3. This narrows the range of the transmittance and decreases the contrast ratio of the LCD panel 100.

In the normally black mode, if the amount of ambient light is small, the voltage $V_{LC}$ is applied within range VR1. If the amount of ambient light exceeds a predetermined value, the voltage range is narrowed to VR3 from VR1 to decrease the contrast ratio.

Returning to FIG. 8, a reference voltage Vref3 (Vref3= $V_1 \times 5/V_4$) is sent to the third judgement circuit 17. The voltage $V_1$ refers to the output voltage of the light receiving device 1 that corresponds to the amount of ambient light at which the light source 114 is turned on and off (in the first embodiment, 5 kilolux). The third judgement circuit 17 sends a switch signal SW, which has a predetermined level, to the power source 19 if the analog voltage signal exceeds the reference voltage Vref3. The power source 19 then stops providing power to the light source 114 in response to the switch signal SW and turns off the light source 114.

A reference voltage Vref4 (Vref4=$V_0 \times 5/V_4$) is sent to the fourth judgement circuit 17. The voltage $V_0$ refers to the output voltage of the light receiving device 1 that corresponds to the amount of ambient light at which the cover 121 switches between opened and closed states (in the first embodiment, 500 lux). If the analog voltage signal exceeds the reference voltage Vref4, the fourth judgement circuit 18 sends a cover signal OC, which has a predetermined level, to the cover driving apparatus 20. The cover driving apparatus 20 then opens the cover 121 to expose the light collector 115 in response to the cover signal OC.

In FIG. 8, the first and second judgement circuits 15, 16 may be integrated into the same circuit. That is, the brightness adjustment signal BC and the contrast ratio adjustment signal CC may be the same signal.

Figure 13:
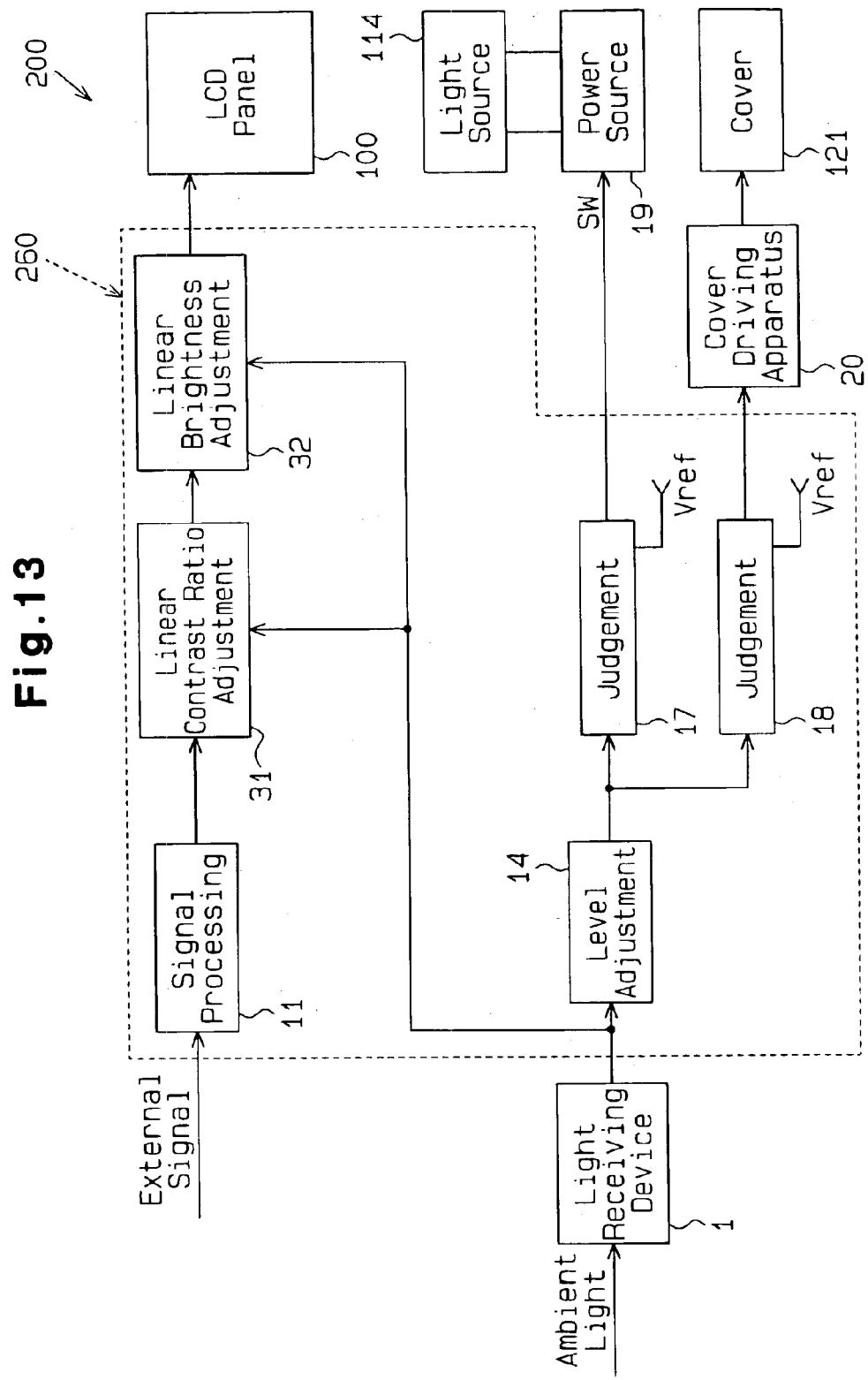
FIG. 13 is a schematic block diagram illustrating a second example of the LCD apparatus of the first embodiment.

FIG. 13 shows a schematic block diagram of a second example of the LCD apparatus 200 according to the first embodiment of the present invention. The LCD apparatus 200 includes the light receiving device 1, a control circuit 260, the LCD panel 100, a power source 19, a cover driving apparatus 20, the cover 121, and the light source 114. The control circuit 260 includes a signal processing circuit 11, a linear contrast ratio adjustment circuit 31, a linear brightness adjustment circuit 32, a level adjustment circuit 14, and two judgement circuits 17, 18.

Figure 14:
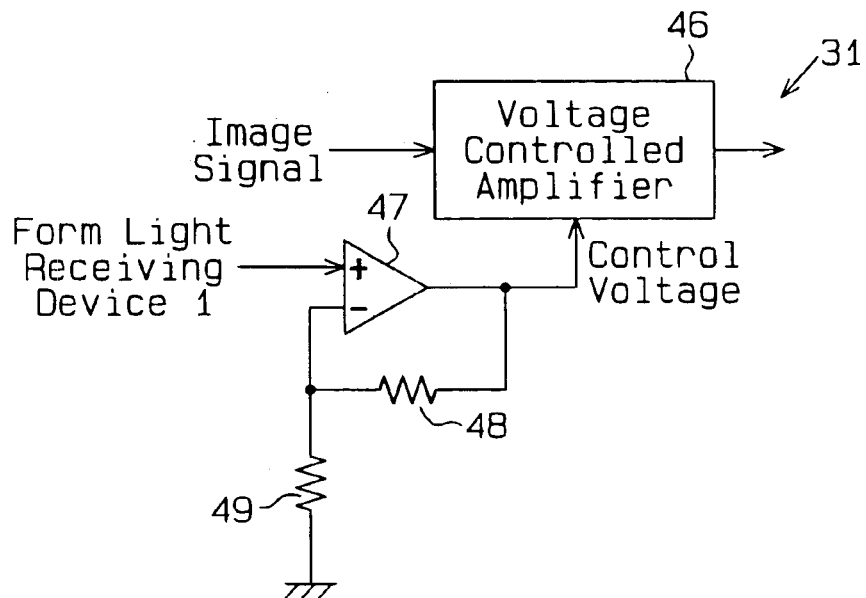
FIG. 14 is a schematic circuit diagram illustrating a linear contrast ratio adjustment circuit of the LCD apparatus of FIG. 13.

As shown in FIG. 14, the linear contrast ratio adjustment circuit 31 includes a voltage controlled amplifier 46, an operational amplifier 47, and resistors 48, 49. The voltage controlled amplifier 46 varies its amplifying range in accordance with a control voltage provided by the operational amplifier 47. The operational amplifier 47 generates the control voltage by amplifying the voltage output by the light receiving device 1 in a linear manner. Accordingly, the voltage controlled amplifier 46 amplifies image signals by varying its amplifying rate in a linear manner in accordance with the control voltage. Therefore, the range of the voltage applied to the pixel electrodes 102 and the common electrode 105 varies together with the amplifying rate of the voltage controlled amplifier 46. This varies the contrast ratio in accordance with the amount of ambient light.

Figure 15:
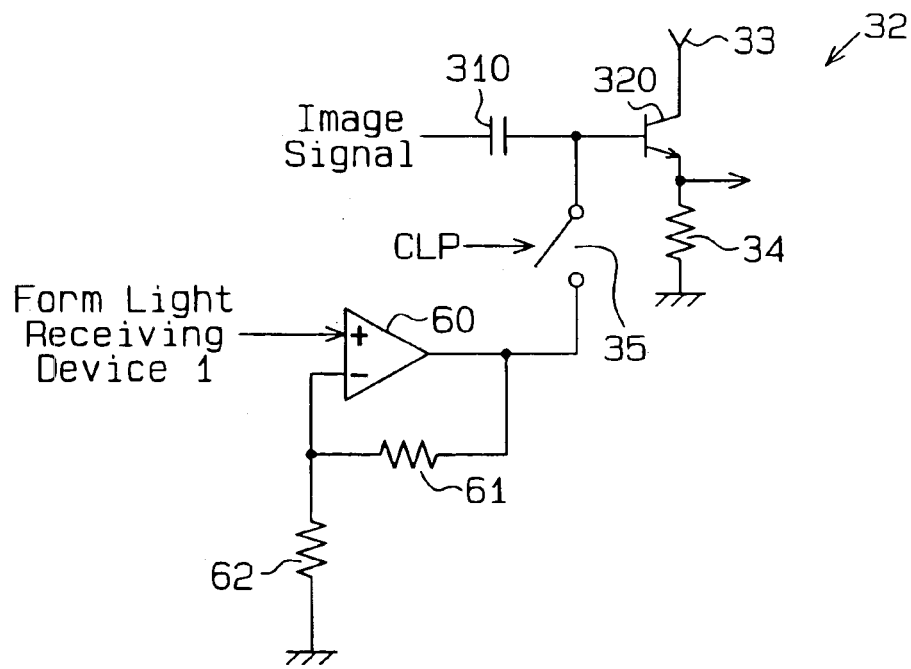
FIG. 15 is a schematic circuit diagram illustrating a linear brightness adjustment circuit of the LCD apparatus of FIG. 13.

As shown in FIG. 15, the linear brightness adjustment circuit 32 includes a capacitor 310, a transistor 320, a resistor 34, a switch 35, an operational amplifier 60, and two resistors 61, 62. The operational amplifier 60 amplifies the voltage output by the light receiving device 1 in a linear manner and feeds the amplified voltage to the switch 35. This varies the clamp level sent to the transistor 320 by way of the switch 35. The varied clamp level then shifts the range of the voltage applied to the pixel electrodes 102 and the common electrode 105. As a result, the image brightness varies in accordance with the amount of ambient light. The control circuit 260 controls the ON/OFF of the light source 114 and the opening and closing of the cover 121 in the same manner as the control circuit 250 of FIG. 8. Therefore, the control circuit 260 will not be described in detail.

Figure 16:
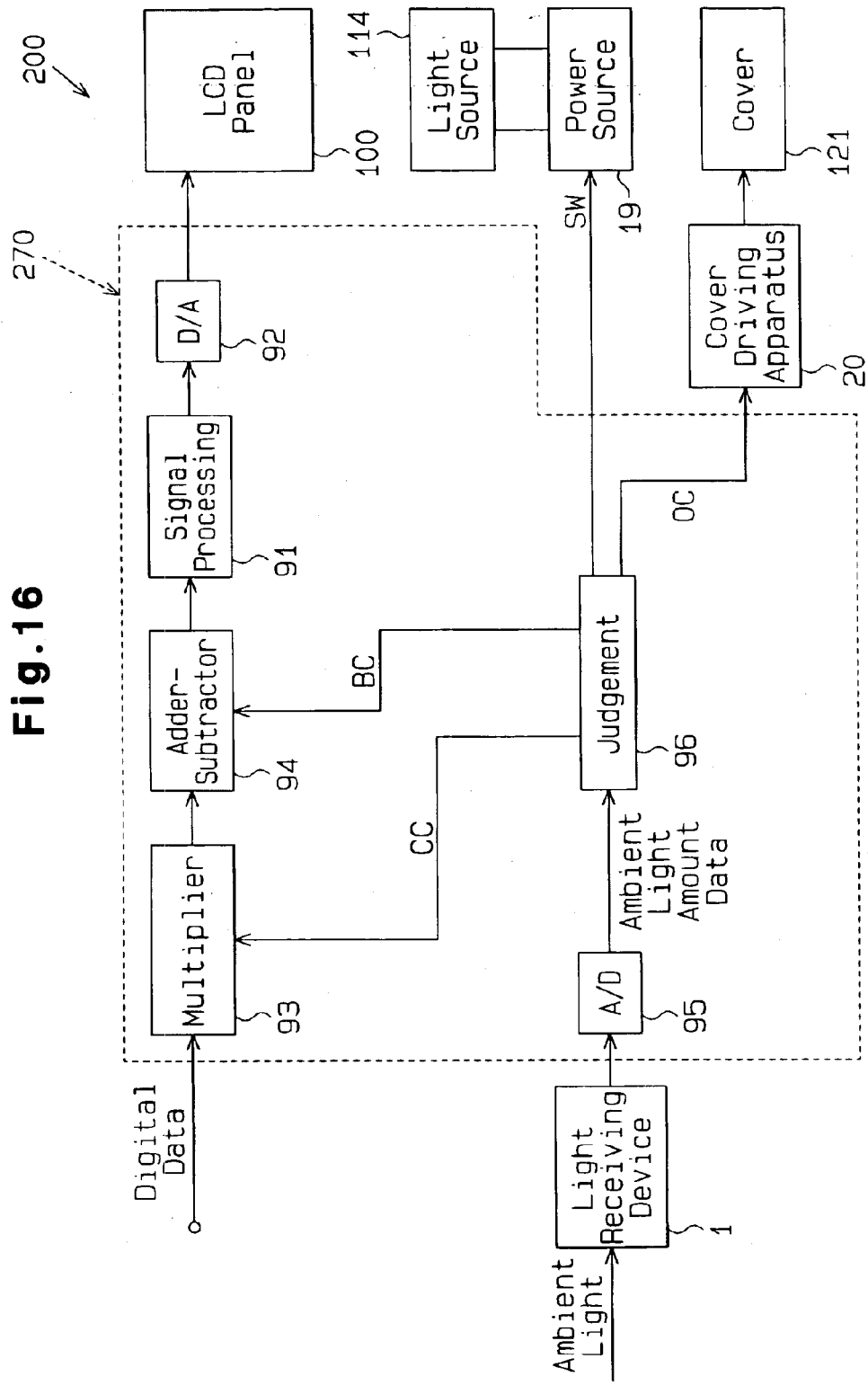
FIG. 16 is a schematic block diagram illustrating a third example of the LCD apparatus of the first embodiment.

FIG. 16 is a schematic block diagram showing a third example of the LCD apparatus 200 according to the first embodiment of the present invention. The LCD apparatus 200 includes a digital control circuit 270, the light receiving device 1, the LCD panel 100, a power source 19, a cover driving apparatus 20, the cover 121, and the light source 114. The digital control circuit 270 includes a multiplier 93, an adder-subtractor 94, a digital signal processing circuit 91, a digital-to-analog (D/A) converter 92, an analog-to-digital (A/D) converter 95, and a judgement circuit 96. The A/D converter 95 converts the output signal of the light receiving device 1 into a digital signal and sends the digital signal (ambient light amount data) to the judgement circuit 96. Four criterion values are stored in the judgement circuit 96. The judgement circuit 96 compares the digital signal with each criterion value.

If the digital signal is smaller than the first criterion value, that is, if the amount of ambient light is insufficient, the judgement circuit 96 outputs a contrast ratio varying signal CC, which is set at "1". If the digital signal is greater than the first criterion value, that is, if the amount of ambient light is sufficient (when the illumination exceeds 50 kilolux), the judgement circuit 96 outputs a contrast ratio varying signal CC, which is set at "0". The multiplier 93 receives digital image signals and multiplies the digital image signals by a predetermined value to decrease the contrast ratio when the contrast ratio varying signal CC is set at "0".

If the digital signal is smaller than the second criterion value, the judgement circuit 96 outputs a brightness varying signal BC, which is set at "1". If the digital signal is greater than the second criterion value, the judgement circuit 96 outputs a brightness varying signal BC, which is set at "0". The adder-subtractor 94 receives digital image signals from the multiplier 94 and adds a predetermined value to the digital image signals to decrease the image brightness when the brightness varying signal BC is set at "0".

The digital signal processing circuit 91 receives the digital image signals, which contrast ratio and brightness have been changed, from the adder-subtractor 94 and performs predetermined digital processing on the digital image signals. The processed digital image signals are converted to analog image signals by the D/A converter 92 and sent to the LCD panel 100.

If the digital signal is smaller than the third criterion value, that is, if the amount of ambient light is 5 kilolux or lower, the judgement circuit 96 outputs a switch signal SW, which is set at "1". If the digital signal is greater than the third criterion value, the judgement circuit 96 outputs a switch signal SW, which is set at "0". The power source 19 feeds electric power to the light source 114 when the switch signal SW is set at "1" and stops feeding electric power to the electric source 114 when the switch signal SW is set at "0".

If the digital signal is smaller than the fourth criterion value, that is, if the amount of ambient light is 500 lux or lower, the judgement circuit 96 outputs a cover signal OC, which is set at "1". If the digital signal is greater than the fourth criterion value, the judgement circuit 96 outputs a cover signal OC, which is set at "0". The cover driving apparatus 20 closes the cover 121 when the cover signal OC is set at "1", and opens the cover 121 when the cover signal OC is set at "0".

Figure 17:
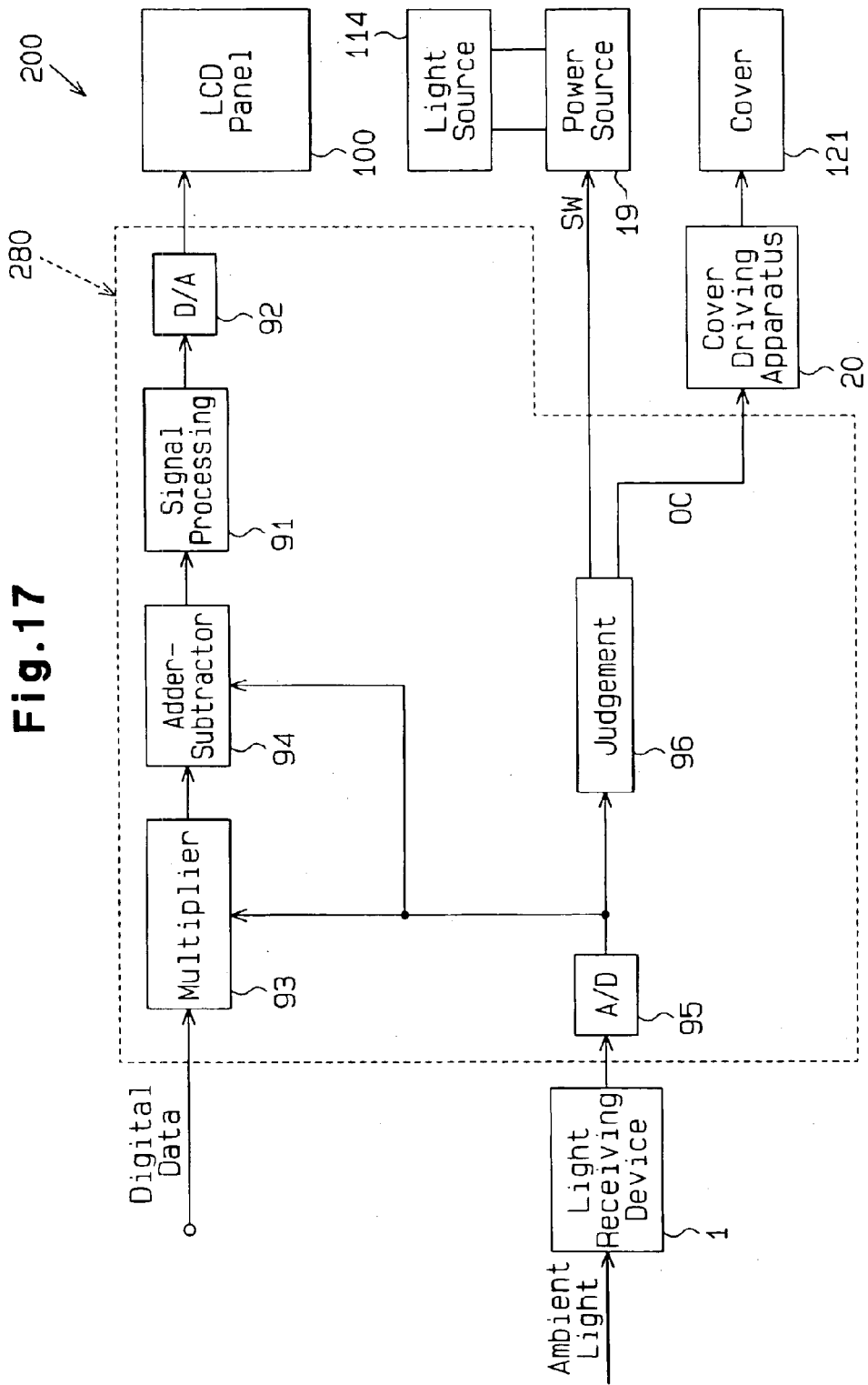
FIG. 17 is a schematic block diagram illustrating a fourth example of the LCD apparatus of the first embodiment.

FIG. 17 is a schematic block diagram showing a fourth example of the first embodiment according to the present invention. The LCD apparatus 200 includes a digital control circuit 280, the light receiving device 1, the LCD panel 100, a power source 19, a cover driving apparatus 20, the cover 121, and the light source 114. The digital control circuit 280 includes a multiplier 93, an adder-subtractor 94, a digital signal processing circuit 91, a D/A converter 92, an A/D converter 95, and a judgement circuit 96. The multiplier 93 receives digital image signals and multiplies the digital image signals with the ambient light digital signal (ambient light amount) from the A/D converter 95 to adjust the contrast ratio. The adder-subtractor 94 receives digital image signals, which contrast ratio have been adjusted, from the multiplier 93. The digital signal from the A/D converter 95 is then added to and subtracted from the digital image signals by the adder-subtractor 93 to adjust the image brightness. The multiplier 93 and the adder-subtractor 94 adjust the contrast ratio and the brightness in a linear manner. The control circuit 280 controls the ON/OFF of the light source 114 and the opening and closing of the cover 121 in the same manner as the control circuit 270 of FIG. 7. Therefore, the control circuit 280 will not be described in detail.

A magnifying circuit (not shown) may be arranged between the A/D converter 95 and the multiplier 93 to increase the amplitude of the light amount digital signal of the A/D converter 95.

Figure 18:
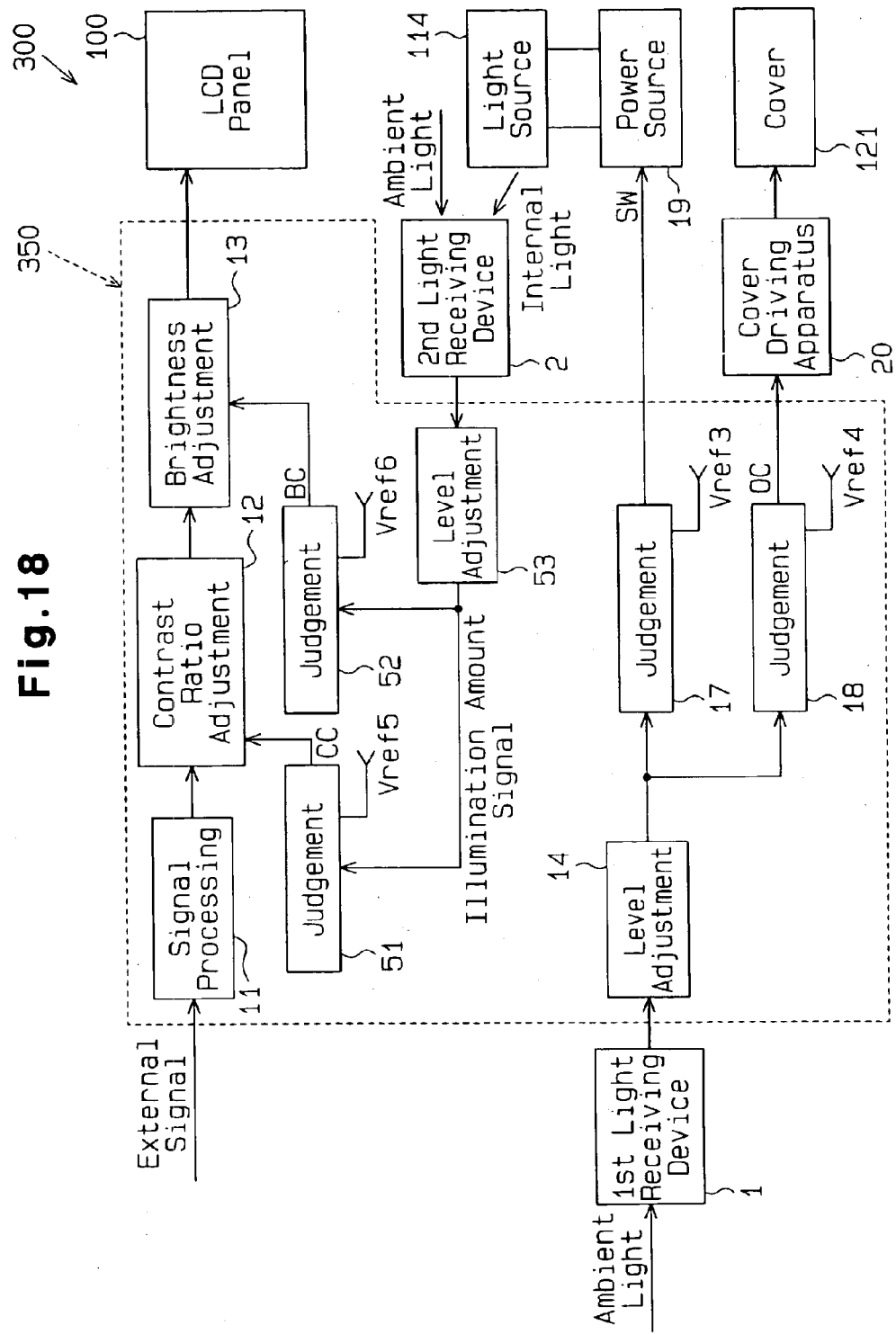
FIG. 18 is a schematic block diagram illustrating a first example of the LCD apparatus according to the second embodiment of the present invention.

FIG. 18 is a schematic block diagram showing a first example of the LCD apparatus 300 according to the second embodiment of the present invention. The LCD apparatus 300 includes the first and second light receiving devices 1, 2, a control circuit 350, the LCD panel 100, a power source 19, a cover driving apparatus 20, the cover 121, and the light source 114. The control circuit 350 includes a signal processing circuit 11, a contrast ratio adjustment circuit 12, a brightness adjustment circuit 13, a first level adjustment circuit 14, a second level adjustment circuit 53, a first judgement circuit 51, a second judgement circuit 52, a third judgement circuit 17, and a fourth judgement circuit 18.

The second level adjustment circuit 53 receives output signals from the second light receiving device 2 that are indicative of the total amount of ambient and internal light. The second level adjustment circuit 53 then converts these output signals to illumination amount signals, which maximum voltage is 5V.

The first judgement circuit 51 receives the illumination amount signals from the level adjustment circuit 53 and compares these signals with a reference voltage Vref5. The reference voltage Vref5 functions as a criterion of the total amount of ambient and internal light when adjusting the contrast ratio. Accordingly, if the illumination amount signals exceed the reference voltage Vref5, the first judgement circuit 51 sends a contrast ratio adjustment signal CC, which has a predetermined level, to the contrast ratio adjustment circuit 12. The contrast ratio adjustment circuit 12 adjusts the contrast ratio in accordance with the contrast ratio adjustment signal CC.

The second judgement circuit 52 receives the illumination amount signals from the level adjustment circuit 53 and compares these signals with a reference voltage Vref6. The reference voltage Vref6 functions as a criterion of the total amount of ambient and internal light when adjusting the image brightness. In the second embodiment, the reference voltages Vref5, Vref6 are substantially the same value. Accordingly, if the illumination amount signal exceeds the reference voltage Vref6, the second judgement circuit 52 sends a brightness adjustment signal BC, which has a predetermined level, to the brightness adjustment circuit 13. The brightness adjustment circuit 13 adjusts the brightness in accordance with the contrast ratio adjustment signal BC.

Figure 19:
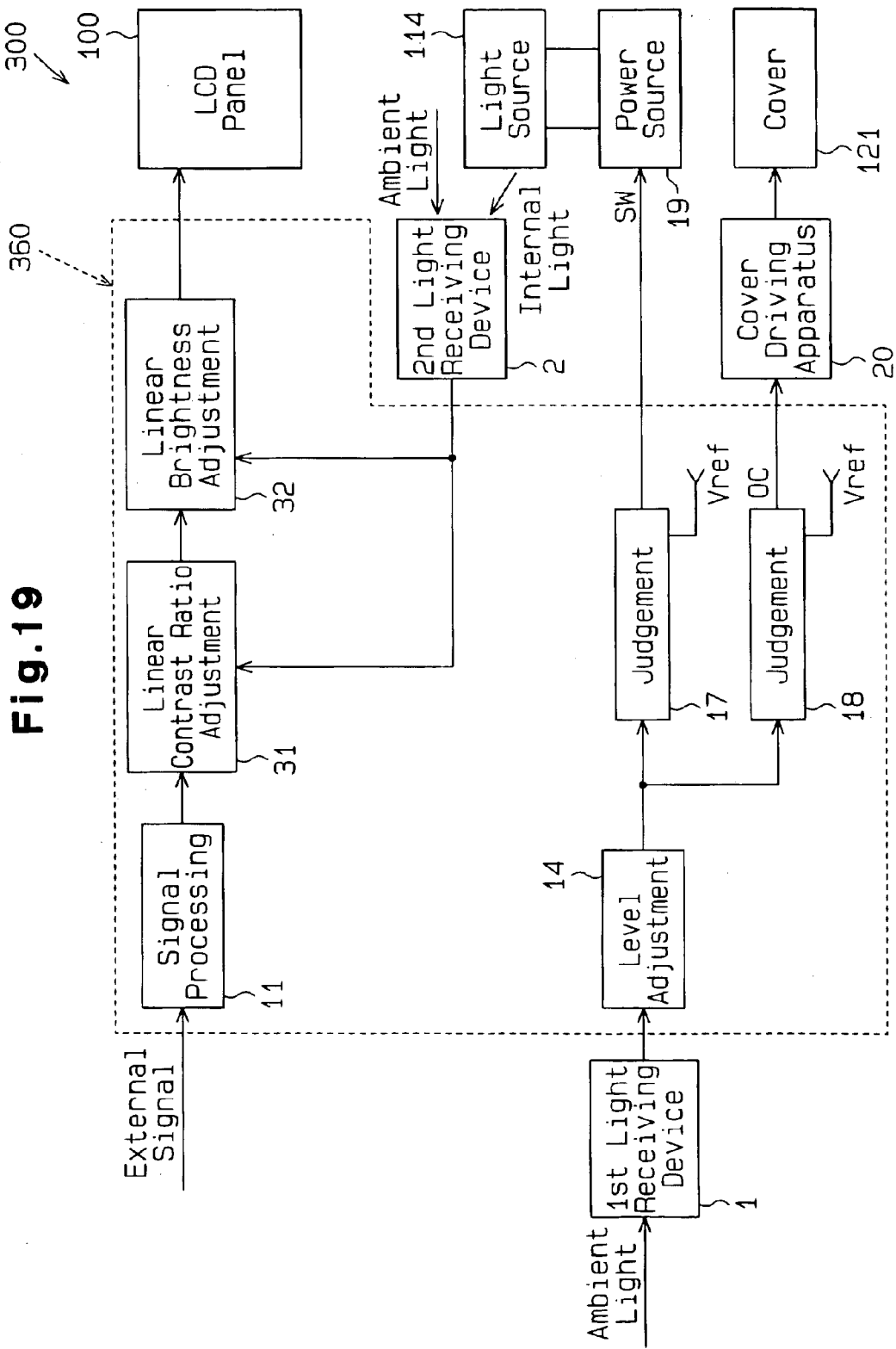
FIG. 19 is a schematic block diagram illustrating a second example of the LCD apparatus according to the second embodiment of the present invention.

FIG. 19 is a schematic block diagram showing a second example of the LCD apparatus 300 according to the second embodiment of the present invention. The LCD apparatus 300 includes the first and second light receiving devices 1, 2, a control circuit 360, the LCD panel 100, a power source 19, the cover driving apparatus 20, the cover 121, and the light source 114. The control circuit 360 includes a signal processing circuit 11, a linear contrast ratio adjustment circuit 31, a linear brightness adjustment circuit 32, a level adjustment circuit 14, and two judgement circuits 17, 18.

The linear contrast adjustment circuit 31 has substantially the same structure as that of FIG. 14 and amplifies image signals in a linear manner in accordance with the voltage output by the second light receiving device 2. Accordingly, the contrast ratio varies in accordance with the total amount of ambient and internal light.

The linear brightness adjustment circuit 32 has substantially the same structure as that of FIG. 15 and varies a clamp level in accordance with the voltage output by the second light receiving device 2. Accordingly, the image brightness varies in accordance with the total amount of ambient and internal light.

As described above, the ON/OFF of the light source 114 and the adjustment of the contrast ratio and the image brightness is performed automatically in accordance with the amount of ambient light. That is, the amount of ambient light is relatively small, the light source 114 is turned on and the constant ration and the image brightness are adjusted. Accordingly, a display image having a high contrast ratio is obtained and visibility is improved.

It should be apparent to those skilled in the art that the present invention may be embodied in many other specific forms without departing from the spirit or scope of the invention. The application of the present invention is not limited to an LCD apparatus having a backlight 100 arranged behind a transmission type LCD panel 100. For example, the present invention may be applied to an LCD apparatus having an luminescent portion arranged in front of a reflective type or anti-transmission type LCD panel 100. The present invention may also be applied to portable equipment, such as portable televisions, video cameras, and digital still cameras.

The present examples and embodiments are to be considered as illustrative and not restrictive, and the invention is not to be limited to the details given herein, but may be modified within the scope and equivalence of the appended claims.

What is claimed is:

1. A liquid crystal display apparatus comprising:
   a liquid crystal display panel having a predetermined display characteristic;

a luminescent unit located adjacent to the liquid crystal display panel, wherein the luminescent unit includes a light collector, which collects ambient light, and a light source, wherein the collected ambient light is used as a backlight of the liquid crystal display panel;

a light receiving device substantially countering an optical path of the ambient light collected by the light collector, wherein the light collector illuminates the rear surface of the liquid crystal display panel, and the light receiving device detects the amount of collected ambient light; and a control circuit electrically connected to the liquid crystal display panel and the light receiving device, wherein the control circuit varies the predetermined display characteristic in accordance with the amount of the detected ambient light, wherein the predetermined display characteristic includes transmittance, the control circuit changing a minimum transmittance in accordance with the amount of collected ambient light, and wherein the liquid crystal display panel includes electrodes to which a voltage of a predetermined range is applied, wherein the control circuit shifts the predetermined voltage range in accordance with the amount of collected ambient light to thereby change the minimum transmittance, wherein the liquid crystal display panel includes:

first and second substrates opposing to each other;

a liquid crystal layer arranged between the first and second substrates; and a sealed portion for sealing the liquid crystal layer and defining a peripheral area and a display area of the liquid crystal display panel, wherein the light receiving device is formed on one of the facing surfaces of the first and second substrates in the peripheral area and is formed between the first and second substrates.

2. The apparatus according to claim 1, wherein the liquid crystal display panel is operated in a normally white mode, and wherein the control circuit shifts the predetermined voltage range to a high voltage range in order to decrease the minimum transmittance when the amount of collected ambient light is equal to or greater than a predetermined value.

3. The apparatus according to claim 1, wherein the liquid crystal display panel is operated in a normally black mode, and wherein the control circuit shifts the predetermined voltage range to a low voltage range in order to decrease the minimum transmittance when the amount of collected ambient light is equal to or greater than a predetermined value.

4. A liquid crystal display apparatus comprising:

a liquid crystal display panel having a predetermined display characteristic;

a luminescent unit located adjacent to the liquid crystal display panel, wherein the luminescent unit includes a light collector, which collects ambient light, and a light source, wherein the collected ambient light is used as a backlight of the liquid crystal display panel;

a light receiving device substantially countering an optical path of the ambient light collected by the light collector, wherein the light collector illuminates the rear surface of the liquid crystal display panel, and the light receiving device detects the amount of collected ambient light; and a control circuit electrically connected to the liquid crystal display panel and the light receiving device, wherein the control circuit varies the predetermined display characteristic in accordance with the amount of the detected ambient light, wherein the predetermine display characteristic includes contrast ratio, the control circuit adjusting the contrast ratio of the liquid crystal display panel in accordance with the amount of collected ambient light, and wherein the liquid crystal display panel includes electrodes to which a voltage of a predetermined range is applied, and wherein the control circuit narrows the predetermined voltage range in order to decrease the contrast ratio when the amount of collected ambient light is equal to or greater than a predetermined value, wherein the liquid crystal display panel includes:

first and second substrates opposing to each other;

a liquid crystal layer arranged between the first and second substrates; and a sealed portion for sealing the liquid crystal layer and defining a peripheral area and a display area of the liquid crystal display panel, wherein the light receiving device is formed on one of the facing surfaces of the first and second substrates in the peripheral area and is formed between the first and second substrates.

5. A liquid crystal display apparatus comprising:

a liquid crystal display panel having a predetermined display characteristic;

a luminescent unit located adjacent to the liquid crystal display panel, wherein the luminescent unit includes a light collector, which collects ambient light, and a light source, wherein the collected ambient light is used as a backlight of the liquid crystal display panel;

a light receiving device substantially countering the ambient light directed toward the light collector to detect the amount of ambient light collected by the light collector; and a control circuit electrically connected to the liquid crystal display panel and the light receiving device, wherein the control circuit varies the predetermined display characteristic in accordance with the amount of the detected ambient light, wherein the predetermined display characteristic includes transmittance, the control circuit changing a minimum transmittance in accordance with the amount of collected ambient light, and, wherein the luminescent unit includes a cover that moves between an open and closed position to selectively cover the light collector, and wherein the apparatus includes a cover driving apparatus connected to the control circuit to move the cover between the open and closed positions and the predetermined display characteristic includes opening and closing of the cover.

6. The apparatus according to claim 5, wherein the control circuit is connected to the light source, the control circuit turning off the light source when the amount of collected ambient light is equal to or greater than a predetermined value and turning on the light source when the amount of collected ambient light is less than the predetermined value.

7. The apparatus according to claim 5, wherein the control circuit controls the cover driving apparatus such that the cover moves to the open position to expose the light collector when the amount of collected light becomes equal to or greater than a predetermined value and moves to the closed position to cover the light collector when the amount of collected ambient light becomes smaller than a predetermined value.

8. The apparatus according to claim 5, wherein the control circuit is connected to the light source, and wherein the control circuit controls the light source and the cover driving apparatus such that the light source is turned on and the cover is closed when the amount of collected ambient light is equal to or smaller than a first predetermined value, the cover is opened when the amount of collected ambient light exceeds the first predetermined value, and the light source is turned off when the amount of collected ambient light exceeds a second predetermined value, which is greater than the first predetermined value.

9. The apparatus according to claim 8, wherein the predetermined display characteristic includes contrast ratio and transmittance, and wherein the control circuit decreases the contrast ratio and the minimum transmittance when the amount of collected ambient light exceeds a third predetermined value, which is greater than the second predetermined value.

10. A liquid crystal display apparatus comprising:

a liquid crystal display panel having a predetermined display characteristic;

a luminescent unit arranged adjacent to the liquid crystal display panel for providing light to the display panel to illuminate the display panel, wherein the luminescent unit includes a light collector, which collects ambient light, and a light source, wherein the collected ambient light is used as a backlight of the liquid crystal display panel;

a light receiving device substantially countering an optical path of the ambient light collected by the light collector, wherein the light collector illuminates the rear surface of the liquid crystal display panel, and the light receiving device generates a light amount signal corresponding to the amount of collected ambient light; and a control circuit electrically connected to the liquid crystal display panel and the light receiving device, wherein the control circuit varies the predetermined display characteristic in accordance with the light amount signal, wherein the liquid crystal display panel includes:

first and second substrates opposing to each other;

a liquid crystal layer arranged between the first and second substrates; and a sealed portion for sealing the liquid crystal layer and defining a peripheral area and a display area of the liquid crystal display panel, wherein the light receiving device is formed on one of the facing surfaces of the first and second substrates in the peripheral area and is arranged between the first and second substrates.

11. The apparatus according to claim 10, wherein the predetermined display characteristic includes transmittance, the control circuit changing the minimum transmittance, in accordance with the light amount signal.

12. The apparatus according to claim 10, wherein the predetermined display characteristic includes contrast ratio, the control circuit changing the contrast ratio in accordance with the light amount signal.

13. A liquid crystal display apparatus comprising:

a liquid crystal display panel having a predetermined display characteristic;

a luminescent unit arranged adjacent to the liquid crystal display panel for providing light to the display panel to illuminate the display panel, wherein the luminescent unit includes a light collector, which collects ambient light, and a light source, wherein the collected ambient light is used as a backlight of the liquid crystal display panel;

a light receiving device substantially countering an optical path of the ambient light collected by the light collector, wherein the light collector illuminates the rear surface of the liquid crystal display panel, and the light receiving device generates a light amount signal corresponding to the amount of collected ambient light; and a control circuit electrically connected to the liquid crystal display panel and the light receiving device, wherein the control circuit varies the predetermined display characteristic in accordance with the light amount signal, wherein the liquid crystal display panel includes a pair of substrates, and wherein the light receiving device is arranged facing the luminescent unit on one of the substrates and adjacent to the display area of the liquid crystal display panel, wherein the liquid crystal display panel includes:

first and second substrates opposing to each other;

a liquid crystal layer arranged between the first and second substrates; and a sealed portion for sealing the liquid crystal layer and defining a peripheral area and a display area of the liquid crystal display panel, wherein the light receiving device is formed on one of the facing surfaces of the first and second substrates in the peripheral area and is formed between the first and second substrates.

14. The apparatus according to claim 13, wherein the predetermined display characteristic includes transmittance, the control circuit changing the minimum transmittance in accordance with the light amount signal.

15. The apparatus according to claim 13, wherein the predetermined display characteristic includes contrast ratio, the control circuit changing the contrast ratio in accordance with the light amount signal.

16. A liquid crystal display apparatus comprising:

a liquid crystal display panel for displaying an image having a predetermined contrast ratio and brightness;

a luminescent unit arranged adjacent to the liquid crystal display panel, wherein the luminescent unit includes a light collector, which collects ambient light, a light source, and a cover, which opens and closes to selectively cover the light collector, wherein the collected ambient light is used as a backlight of the liquid crystal display panel;

a cover driving apparatus for opening and closing the cover;

a light receiving device substantially countering the ambient light directed toward the light collector to generate a light receiving signal corresponding to the amount of ambient light collected by the light collector; and a control circuit connected to the liquid crystal display panel, the light receiving device, the light source, and the cover driving apparatus, wherein the control circuit controls an ON/OFF of the light source, the opening and closing of the cover, and adjusts the contrast ratio and the brightness in accordance with the light receiving signal, wherein the control circuit includes:

a judgment circuit for generating at least one of a contrast ratio adjustment signal, a brightness adjustment signal, a cover driving signal and an ON/OFF signal in accordance with the light receiving signal;

a contrast ratio adjustment circuit connected to the judgment circuit, the contrast ratio adjustment circuit processing an image signal to adjust the contrast ratio in accordance with the contrast ratio adjustment signal; and a brightness adjustment circuit connected to the contrast ratio adjustment circuit and the liquid crystal display panel, the brightness adjustment circuit processing the image signal, which contrast ratio has been adjusted, to adjust the brightness in accordance with the brightness adjustment signal, and wherein the judgment circuit includes:
a first judgment circuit for receiving the light receiving signal from the light receiving device and comparing the light receiving signal with a first criterion value to generate a contrast ratio adjustment signal;
a second judgment circuit for receiving the light receiving signal from the light receiving device and comparing the light receiving signal with a second criterion value to generate a brightness adjustment signal;
a third judgment circuit connected to the cover driving apparatus, the third judgment circuit receiving the light receiving signal from the light receiving device and comparing the light receiving with a third criterion value to generate a cover driving signal; and
a fourth judgment circuit connected to the light source, the fourth judgment circuit receiving the light receiving signal from the light receiving device and comparing the light receiving signal with a fourth criterion value to generate an ON/OFF signal.

17. A liquid crystal display apparatus comprising:
a liquid crystal display panel for displaying an image having a predetermined contrast ratio and brightness;
a luminescent unit arranged adjacent to the liquid crystal display panel, wherein the luminescent unit includes a light collector, which collects ambient light, a light source, and a cover, which opens and closes to selectively cover the light collector, wherein the collected ambient light is used as a backlight of the liquid crystal display panel;
a cover driving apparatus for opening and closing the cover;
a light receiving device substantially countering the ambient light directed toward the light collector to generate a light receiving signal corresponding tot he amount of ambient light collected by the light collector; and
a control circuit connected to the liquid crystal display panel, the light receiving device, the light source, and the cover driving apparatus, wherein the control circuit controls an ON/OFF of the light source, the opening and closing of the cover, and adjusts the contrast ratio and the brightness in accordance with the light receiving signal, wherein the control circuit includes:
a linear contrast ratio adjustment circuit for receiving the light receiving signal and processing an image signal to adjust the contrast ratio in a linear manner in accordance with the light receiving signal;
a linear brightness adjustment circuit connected to the linear contrast ratio adjustment circuit and the liquid crystal display panel, the linear brightness adjustment circuit receiving the light receiving signal from the light receiving device and processing the image signal, which contrast ratio has been adjusted, to adjust the brightness in a linear manner in accordance with the light receiving signal;
a first judgment circuit connected to the cover driving apparatus, the first judgment circuit receiving the light receiving signal from the light receiving device and comparing the light receiving signal with a first criterion value to generate a cover driving signal; and
a second judgment circuit connected to the light source, the second judgment circuit receiving the light receiving signal from the light receiving device and comparing the light receiving signal with a second criterion value to generate an ON/OFF signal.

18. A liquid crystal display apparatus comprising:
a liquid crystal display panel for displaying an image having a predetermined contrast ratio and brightness;
a luminescent unit arranged adjacent tot he liquid crystal display panel, wherein the luminescent unit includes a light collector, which collects ambient light, a light source, and a cover, which opens and closes to selectively cover the light collector, wherein the collected ambient light is used as a backlight of the liquid crystal display panel;
a cover driving apparatus for opening and closing the cover;
a light receiving device substantially countering the ambient light directed toward the light collector to generate a light receiving signal corresponding to the amount of ambient light collected by the light collector; and
a control circuit connected to the liquid crystal display panel, the light receiving device, the light source, and the cover driving apparatus, wherein the control circuit controls an ON/OFF of the light source, the opening and closing of the cover, and adjusts the contrast ratio and the brightness in accordance with the light receiving signal, wherein the control circuit includes:
an analog-to-digital converter connected to the light receiving device to convert the light receiving signal to a digital light receiving signal;
a judgment circuit connected to the analog-to-digital converter, the cover drive apparatus, and the light source, wherein the judgment circuit compares the digital light receiving signal with a first criterion value to generate a contrast ratio adjustment signal, compares the digital light receiving signal with a second criterion value to generate a brightness adjustment signal, compares the digital light receiving signal with a third criterion value to generate a cover driving signal, and compares the digital light receiving signal with a fourth criterion value to generate an ON/OFF signal;
a multiplier connected to the judgment circuit to multiply a digital image signal with the contrast ratio adjustment signal to adjust the contrast ratio thereof;
an adder-subtractor connected to the multiplier and the judgment circuit to perform summation and subtraction on the digital image signal, which contrast ratio has been adjusted, with the brightness adjustment signal to adjust the brightness;
a digital signal processing circuit connected to the adder-subtractor to perform a predetermined digital signal process on the digital image signal, which contrast ratio and brightness have been adjusted; and
a digital-to-analog converter connected between the digital signal processing circuit and the liquid crystal display panel to convert the processed digital image signal to an analog image signal.

19. A liquid crystal display apparatus comprising:
a liquid crystal display panel for displaying an image having a predetermined contrast ratio and brightness;
a luminescent unit arranged adjacent to the liquid crystal display panel, wherein the luminescent unit includes a light collector, which collects ambient light, a light source, and a cover, which opens and closes to selectively cover the light collector, wherein the collected ambient light is used as a backlight of the liquid crystal display panel;

a cover driving apparatus for opening and closing the cover;

a light receiving device substantially countering the ambient light directed toward the light collector to generate a light receiving signal corresponding to the amount of ambient light collected by the light collector; and a control circuit connected to the liquid crystal display panel, the light receiving device, the light source, and the cover driving apparatus, wherein the control circuit controls an ON/OFF of the light source, the opening and closing of the cover, and adjusts the contrast ratio and the brightness in accordance with the light receiving signal, wherein the control circuit includes:

an analog-to-digital converter connected to the light receiving device to convert the light receiving signal to digital light receiving signal;

a multiplier connected to the analog-to-digital converter to multiply the digital image signal with the digital light receiving signal to adjust the contrast ratio thereof;

an adder-subtractor connected to the multiplier and the analog-to-digital converter to perform summation and subtraction on the digital image signal, which contrast ratio has been adjusted, with the digital light receiving signal to adjust the brightness; and a judgment circuit connected to the analog-to-digital converter, the cover driving apparatus, and the light source, wherein the judgment circuit compares the digital light receiving signal with a first criterion value to generate a cover driving signal and compares the digital light receiving signal with a second criterion value to generate an ON/OFF signal.

20. A liquid crystal display apparatus comprising:

a liquid crystal display panel for displaying an image having a predetermined contrast ratio and brightness;

a luminescent unit arranged adjacent to the liquid crystal display panel, wherein the luminescent unit includes a light collector, which collects ambient light, a light source, and a cover, which opens and closes too selectively cover the light collector, wherein the collected ambient light is used as a backlight of the liquid crystal display panel;

a cover driving apparatus for opening and closing the cover;

a first light receiving device substantially countering the ambient light directed toward the light collector to generate a first light receiving signal corresponding to amount of ambient light collected by the light collector;

a second light receiving device for generating a second light receiving signal corresponding to a total amount of light illuminating the liquid crystal panel, which includes the ambient light and the light of the light source; and a control circuit connected to the liquid crystal display panel, the first and second light receiving devices, the light source, and the cover driving apparatus, wherein the control circuit controls an ON/OFF of the light source and the opening and closing of the cover in accordance with the first light receiving signal, and adjusts the contrast ratio and the brightness in accordance with the second light receiving signal.

21. The apparatus according to claim 20, wherein the control circuit includes:

a judgment circuit for generating at least one of a contrast ratio adjustment signal, a brightness adjustment signal, a cover driving signal and an ON/OFF signal in accordance with at least one of the first and second light receiving signals;

a contrast ratio adjustment circuit connected to the first judgment circuit, the contrast ratio adjustment circuit processing an image signal to adjust the contrast ratio of the image signal in accordance with the contrast ratio adjustment signal; and a brightness adjustment circuit connected to the contrast ratio adjustment circuit and the liquid crystal display panel, the brightness adjustment circuit processing the image signal, which contrast ratio has been adjusted, to adjust the brightness in accordance with the brightness adjustment signal from the second judgment circuit.

22. The apparatus according to claim 21, wherein the judgment circuit includes:

a first judgment circuit for receiving the second light receiving signal from the second light receiving device and comparing the second light receiving signal with a first criterion value to generate a contrast ratio adjustment signal;

a second judgment circuit for receiving the second light receiving signal from the second light receiving device and comparing the second light receiving signal with a second criterion value to generate a brightness adjustment signal;

a third judgment circuit connected to the cover driving apparatus, the third judgment circuit receiving the first light receiving signal from the first light receiving device and comparing the first light receiving signal with a third criterion value to generate a cover driving signal; and a fourth judgment circuit connected to the light source, the fourth judgment circuit receiving the first light receiving signal from the first light receiving device and comparing the first light receiving signal with a fourth criterion value to generate an ON/OFF signal.

23. The apparatus according to claim 20, wherein the control circuit includes:

a linear contrast ratio adjustment circuit for receiving the second light receiving signal from the second light receiving device and processing an image signal to adjust the contrast ratio in a linear manner in accordance with the second light receiving signal;

a linear brightness adjustment circuit connected to the linear contrast ratio adjustment circuit and the liquid crystal display panel, the linear brightness adjustment circuit receiving the second light receiving signal from the second light receiving device and processing the image signal, which contrast ratio has been adjusted, to adjust the brightness in a linear manner in accordance with the second light receiving signal;

a first judgment circuit connected to the cover driving apparatus, the first judgment circuit receiving the first light receiving signal from the first light receiving device and comparing the first light receiving signal with a first criterion value to generate a cover driving signal; and a second judgment circuit connected to the light source, the second judgment circuit receiving the first light receiving signal from the first light receiving device and comparing the first light receiving signal with a second criterion value to generate an ON/OFF signal.

* * * * *